US 7,373,391 B2

(12) United States Patent
Iinuma

(10) Patent No.: US 7,373,391 B2
(45) Date of Patent: May 13, 2008

(54) SYSTEM AND METHOD FOR DIGITAL CONTENT DISTRIBUTION

(75) Inventor: Satoshi Iinuma, Nagano-ken (JP)

(73) Assignee: Seiko Epson Corporation, Nagano-ken (JP)

( * ) Notice: Subject to any disclaimer, the term of this patent is extended or adjusted under 35 U.S.C. 154(b) by 557 days.

(21) Appl. No.: 09/983,496

(22) Filed: Oct. 24, 2001

(65) Prior Publication Data

US 2002/0073214 A1    Jun. 13, 2002

(30) Foreign Application Priority Data

Oct. 24, 2000  (JP)  .............. 2000-324626
Oct. 24, 2000  (JP)  .............. 2000-324627

(51) Int. Cl.
*G06F 15/16* (2006.01)
*G06F 17/00* (2006.01)
*G09G 5/00* (2006.01)

(52) U.S. Cl. .............. 709/217; 715/500; 345/665

(58) Field of Classification Search ............. 709/211, 709/202, 232, 201, 203, 231, 218, 217; 715/500; 345/665
See application file for complete search history.

(56) References Cited

U.S. PATENT DOCUMENTS 5,715,403 A * 2/1998 Stefik ...................... 705/44
5,917,912 A   6/1999 Ginter et al.
5,933,498 A * 8/1999 Schneck et al. ........... 705/54
5,958,005 A * 9/1999 Thorne et al. ............. 709/202
6,006,332 A * 12/1999 Rabne et al. .............. 713/201
6,044,405 A * 3/2000 Driscoll et al. ............ 709/232
6,167,382 A * 12/2000 Sparks et al. .............. 705/26

(Continued)

FOREIGN PATENT DOCUMENTS

EP       0 715 245 A1       6/1996

(Continued)

OTHER PUBLICATIONS

Jao C S et al.; "The Display of Photographic-Quality Images on the Web: A Comparison of Two Technologies", IEEE Transactions on Information Technology in Biomedicine, IEEE Service Center, Piscataway, NJ, US vol. 3, No. 1, Mar. 1999, pp. 70-73, XP000991575.

(Continued)

*Primary Examiner*—Saleh Najjar
*Assistant Examiner*—V. Korobov
(74) *Attorney, Agent, or Firm*—Sughrue Mion, PLLC

(57) ABSTRACT

The present invention makes it possible to distribute digital content managed under copyright to a large number of users through a communications network while ensuring copyright protection. The web server 12 distributes images requested by the user through the Internet to the user PC 6. The image data distributed from the web server 12 is encrypted and can only be decrypted by the special image editor 22 on the user PC 6. Control data indicating the usage restrictions according to copyright are included in the image data distributed from the web server 12. The image editor 22 controls the edit operations and print specifications that can be used with the images downloaded from the web server 12 according to that control data. The image editor 22 carries out image printing only in the case where a settlement process for image fees is completed.

24 Claims, 22 Drawing Sheets

U.S. PATENT DOCUMENTS

| | | | |
|---|---|---|---|
| 6,209,097 | B1 | 3/2001 | Nakayama et al. |
| 6,522,418 | B2 | 2/2003 | Yokomizo et al. |
| 6,628,417 | B1 * | 9/2003 | Naito et al. ................. 358/1.15 |
| 6,850,248 | B1 * | 2/2005 | Crosby et al. .............. 345/619 |
| 6,959,339 | B1 * | 10/2005 | Wu et al. ................... 709/246 |
| 2001/0032251 | A1 * | 10/2001 | Rhoads et al. ............. 709/217 |
| 2002/0007456 | A1 * | 1/2002 | Peinado et al. ............. 713/164 |
| 2005/0052469 | A1 * | 3/2005 | Crosby et al. .............. 345/619 |

FOREIGN PATENT DOCUMENTS

| | | |
|---|---|---|
| JP | 63212275 A | 5/1988 |
| JP | 63212276 A | 5/1988 |
| JP | 02-221975 A | 9/1990 |
| JP | 03040689 | 2/1991 |
| JP | 4-319863 A | 11/1992 |
| JP | 034335476 A | 11/1992 |
| JP | 05-063961 A | 3/1993 |
| JP | 5-324790 A | 12/1993 |
| JP | 06-070137 A | 3/1994 |
| JP | 07131452 A | 5/1995 |
| JP | 08-263440 A | 10/1996 |
| JP | 09-116744 A | 5/1997 |
| JP | 09138827 A | 5/1997 |
| JP | 09-193500 A | 7/1997 |
| JP | 09-244865 A | 9/1997 |
| JP | 10-042128 A | 2/1998 |
| JP | 10-070642 A | 3/1998 |
| JP | 10-124586 A | 5/1998 |
| JP | 10-214295 A | 8/1998 |
| JP | 10-215371 A | 8/1998 |
| JP | 10-301904 A | 11/1998 |
| JP | 10-313399 | 11/1998 |
| JP | 11-7241 A | 1/1999 |
| JP | 11-224285 | 8/1999 |
| JP | 11-339056 A | 12/1999 |
| JP | 11-345261 | 12/1999 |
| JP | 2000-076339 | 3/2000 |
| JP | 2000-081959 A | 3/2000 |
| JP | 2000-112687 A | 4/2000 |
| JP | 2000-137592 A | 5/2000 |
| JP | 2000-155666 | 6/2000 |
| JP | 2000198248 A | 7/2000 |
| JP | 2000-261578 A | 9/2000 |
| JP | 2000-268096 A | 9/2000 |
| JP | 2000-268164 A | 9/2000 |
| JP | 2000-285174 A | 10/2000 |
| JP | 2000-298567 A | 10/2000 |
| JP | 2000-298569 A | 10/2000 |
| JP | 2001256009 | 9/2001 |
| JP | 2001-344333 | 12/2001 |
| WO | WO 98/42098 A1 | 9/1998 |
| WO | WO 98/44402 A1 | 10/1998 |
| WO | WO 98/50838 A1 | 11/1998 |
| WO | WO 00/21239 A1 | 4/2000 |
| WO | WO 00/062229 A2 | 10/2000 |
| WO | WO 00/062265 A1 | 10/2000 |

OTHER PUBLICATIONS

Alves A D et al., "Interactive Visualization Overth the WWW", Computer Graphics and Image Processing, 2000. Proceedings XIII Brazilian Symposium on Gramado, Brazil Oct. 17-20, 2000, Los Alamitos, CA, USA, IEEE Comput, Soc, US, Oct. 17, 2000, pp. 259-266, XP010521953.

Michaels C et al., "Vizwiz: A Java Applet for Interactive 3D Scientific Visualization on the Web" Proceedings Visualization '97. Pheonix, AZ, Oct. 19-24, 1997, Annual IEEE Conferences on Visualization, Los Alamitos, CA: IEEE Computer Soc, US, vol. Conf. 8, Oct. 19, 1997, pp. 261-267, 550, XP010270092.

Marc A. Kaplan: "IBM Cryptolopes, Super Distribution and Digital Rights Management" IMB Reasearch, Dec. 30, 1996, XP002132994.

* cited by examiner

- AUTHORING SERVER
- IMAGE DATA INPUT (TIFF, JPEG, PNG) — S1
- RESIZING
  - TRUE IMAGE (B0-A4, POSTCARD)
  - THUMBNAIL, PREVIEW
  - LAYOUT — S2
- INSERT WATERMARK — S3
- ENCRYPTION — S4
- CONTAINERIZE IMAGE AND USAGE RESTRICTION INFORMATION — S5
- REGISTRATE — S6

| OUTPUT SIZE | RESOLUTION (dpi) |
|---|---|
| POSTCARD | 350 |
| A4 | 350 |
| A3 | 300 |
| A2 | 200 |
| A1 | 200 |
| B1 | 200 |
| B0 | 180 |

SYSTEM AND METHOD FOR DIGITAL CONTENT DISTRIBUTION

BACKGROUND OF THE INVENTION

1. Field of the Invention

The present invention relates to technology for distributing different types of digital content, such as digital still images, digital movies, digital music, computer programs, digital literature, or decrypted versions of those, from a server through a communications network to a user's computer system.

2. Description of the Related Art

A large number of servers for distributing different types of digital content are present on the Internet. Digital images are taken as the example for this explanation, but the situation is the same for other types of digital content as well.

Currently, digital images distributed through the Internet from web sites are copyright-free images or images under the copyright of the webmaster of each web site. At this time, there are no servers that can legally distribute digital images which are strictly controlled under a third party's copyright, through the network to a large number of users. Because it is not technologically possible at this time to control copyrighted digital content scattered throughout the communications network, no one cares to transmit his or her own high-value works through the communications network.

Meanwhile, demand is very high for many of the images strictly controlled under copyright and the prices are accordingly high. Typical examples include photographs of popular performers, posters of popular movies, designs of popular characters, and the works of popular artists. At this time, such copyrighted images can only be acquired in printed form through the stores of authorized distributors.

There is, however, a very large number of users who would be delighted to be able to acquire these types of copyrighted images easily using their own computers, through the Internet and without having to go to a store. Many copyright holders would also like to sell their work through the Internet to a large number of users and get high profits if copyright protection could be insured.

Furthermore, prints of copyrighted images provided to the market at this time do not necessarily satisfy user requirements because the designs and layouts are already established. For example, a calendar including photographs of a performer or a postcard including images of an animation character may in many cases not be purchased, even if the user is interested in the artist or character itself, because the user is not interested in the paper size, calendar design, or printed text.

Also, it is common knowledge that machines, with which people and their friends can take their picture and print it out in the form of a sticker including decorative designs, are very popular with young people. Demand for copyrighted images can be expected to increase even more if copyrighted images could be easily acquired for the purpose of creating private photographs or images. However, at this time there is no technology that can make possible easy use of copyrighted images for this purpose, while ensuring copyright protection.

Also, a large number of image-distributing servers is present on the Internet. Conventionally, images distributed from an Internet server were displayed with small quantities of data appropriate for the narrow bandwidth of the communication path and therefore user systems that downloaded those images could only print out low-quality images.

Also, conventional image servers use a mechanism of initially displaying the images that can be provided in the form of small thumbnail images and sending the real image data to the user's computer when the user clicks on the thumbnail. However, even looking at the small thumbnail image, the user cannot correctly determine whether he or she really wants that image. It is therefore often the case that the user realizes that he or she does not want the image after starting to download the real image. For this reason, the user wastes download time and communication costs, as well as image fees if it is a chargeable image.

It is therefore an object of the present invention to make possible the distribution of digital content managed under copyright to a large number of users through a communications network, while ensuring copyright protection.

It is another object of the present invention to provide the digital content managed under copyright in a form that can be used by the user as the user desires, while ensuring copyright protection.

It is another object of the present invention to provide images, provided by a server on a communications network, in the form of a high image quality print to a user.

It is another object of the present invention to have images, provided by a server on a communications network, such that the user can properly determine whether he or she really wants these, before these are actually in the possession of the user.

SUMMARY OF THE INVENTION

According to a first aspect of the present invention, a system for distributing digital content data through a communications network to a user system comprises:

digital content storing means for storing digital content data, encrypted with a prescribed encryption method that can be decrypted only by a dedicated digital-content-using program on a user system;

distribution means for delivering encrypted digital content data stored by the digital content storing means through the communications network to the user system;

usage rights determining means for determining whether the user of the user system has the usage rights for the abovementioned digital content; and usage authorizing means for authorizing the digital-content-using program on the user system to decrypt the abovementioned encrypted digital content data and then output the decrypted digital content, in an output format according to the user's usage rights, and only when a user is determined to have usage rights by the usage rights determining means.

The encrypted digital content data sent from this digital content distributing system to the user system can be decrypted only by a dedicated digital-content-using program on the user system and cannot be decrypted by other applications on the user system. The digital-content-using program can output that decrypted digital content in an output format according to the user's usage rights only when the user is determined to have valid usage rights for that digital content. The digital-content-using program does not output the digital content in a format disallowed by the user's usage rights. Also, the digital-content-using program does not output the digital content if the user does not have valid usage rights.

Digital content can be either free or chargeable. For chargeable digital content, in the preferred embodiment, processing relating to user fees is carried out and output of the effective digital content is allowed once that processing is complete. For example, in the case of a chargeable image, the chargeable image downloaded from a server to the digital-content-using program can be output, printed, for example, according to the usage rights, once the processing relating to user fees is completed. Accordingly, a user for whom the fee-related processing is not complete cannot print the downloaded chargeable image. Moreover, because copyrighted digital content is always encrypted as discussed above regardless of whether the digital content is chargeable or free, that digital content cannot be decrypted except with the use of a digital-content-using program having a special key for decoding that digital content.

In the preferred embodiment, the digital-content-using program has an editing function for editing the output format of the digital content (for example, editing page layout, design, or the image itself in the case of placing and printing the image in a page). The server stores control data for controlling the digital-content-using program so as to allow editing only within the scope of usage restrictions according to the copyright for each piece of digital content. When the server sends digital content data to the user system, this control data for the digital content is also sent. The digital-content-using program on the user system allows the user only those editing operations within the scope of usage restrictions according to the copyright, as in that control data.

In the preferred embodiment, the server stores preview data to allow the user system to preview the digital content, and explanatory data for causing the user system to display an explanatory text for the usage restrictions according to the copyright for that digital content. The server can send the preview data and explanatory data to the user system. Before downloading digital content from the server, the user can see a preview display of that digital content, while learning about the usage restrictions applied to that digital content.

In the preferred embodiment, the server can hold the digital-content-using program and send that digital-content-using program to the user system.

In the preferred embodiment, the server controls the digital-content-using program so as to insert an electronic watermark in the digital content data itself or to insert an electronic watermark in the output data. When the digital-content-using program inserts the electronic watermark, the program can adjust the location at which the electronic watermark is inserted in the output data so that the electronic watermark is effectively displayed according to the output format when the digital content is output. For example, in the case where a plurality of images is printed on the same page, those images sometimes overlap depending on the page layout. In such a case, even if the electronic watermark is embedded in the data for each image, there is a risk that the electronic watermarks will overlap and interfere with each other and lose their function as electronic watermarks. Even in this case, the digital-content-using program can embed the electronic watermarks in that printed data directly before printing and adjust the locations according to the page layout so that the electronic watermarks for the plurality of images do not overlap. The abovementioned problem can thereby be avoided.

In the preferred embodiment, the server is further provided test output authorizing means for authorizing the digital-content-using program in a user system to perform test output of the decrypted data in an incomplete output format. For example, in the case of digital image, the server can allow test printing in an incomplete format of the image downloaded to the user system. Printing in an incomplete format is, for example, printing in a format inappropriate for practical use. Specifically, this is laying some type of mark (for example, a character string such as "Sample" to show that this is test printing) over the image or over the entire page, or by altering the colors so that the image and background can be differentiated. This may also be printing the image in a size much smaller than the original size. With this test output in an incomplete format, a user can generally check whether there will be problems when the image is output in a complete format, and therefore will feel secure in paying the fees and progressing to proper output. Also, a content content provider receives no substantial damage even when allowing test output before the fees are paid, because output in a complete form is not possible with test output.

In the preferred embodiment, the server is further provided repeat output means for making possible second output of the content when the content-using program has an error in the content output. For example, if the user system has an error in the printing of an image in the case of chargeable digital image, the user makes an application to the server to reprint, along with the reason for the error, and the server can save a log of that application and authorize the user system to print the same image once more. Accordingly, even in the unlikely event of an accident, a user is guaranteed to be able to acquire correct output without wasting fees paid. This repeat output can be allowed up to a certain number of times (for example, three times). By saving and analyzing the application log, persons making fraudulent use of this repeat output function can be detected.

According to a second aspect of the present invention, a system for distributing images through a communications network to a user system comprises:

image storing means for storing the true image data, thumbnail image data having a smaller pixel size than the true image data, and preview image data having a pixel size between that of the true image data and the abovementioned thumbnail image data, with respect to each of a plurality of images that can be distributed;

thumbnail image distribution means for distributing the thumbnail image data for a plurality of images to the user system, and causing the user system to display a plurality of thumbnail images;

preview display means for selecting one image from among the plurality of displayed thumbnail images in the list display, transmitting the preview image data for a the selected image to the user system, and causing display of the preview image; and downloading means for receiving requests from the user after the display of the preview image, and transmitting the true image data for the abovementioned selected image to the user system.

In this system, the user can view a preview image that is larger than the thumbnail image but smaller than the true image, after selecting an image viewed in a list of thumbnail image and before downloading the true image data of that selected image, and from that preview image, the user can determine whether the user is really interested in that selected image. When the user is not interested, the user can avoid downloading the true image data and therefore the download time and expenses can be reduced.

Because there are preview images, the true image data can be high-resolution image data suitable for high-quality printing.

In the preferred embodiment, a plurality of true image data having different print sizes is prepared with respect to each image. That true image data has a resolution that increases as the print size decreases. The user can download true image data of the desired print size. Because the resolution is higher for smaller print sizes, the true image data can be printed at high image qualities convenient for close viewing, as printed matter of a small size that is often viewed close up.

In the preferred embodiment, the system relating to the present invention can communicate with an output center to print out the image for the user and further comprises print method selecting means for selecting whether the user will print out the image him or herself or will print out the image with the output center; transmitting means for transmitting the image data through the communications network to the user system in the case where the user will print out the image him or herself; and output requesting means for requesting the output center to print the image when the image is to be printed by the output center.

In this system, when the user cannot make a satisfactory print him or herself, the user can request a print from the output center. Particularly in cases where a very large-sized print is wanted or when a very high quality print is wanted, or in the case where network distribution is limited by the copyright, it is convenient to request a print from the output center.

In the preferred embodiment, when printing will be done by the output center, the user can also edit the layout and design of the print page including the image and request the output center to make the print according to the results of that edit. For example, the user can request the output center to make a print in the form of a calendar or postcard in a design edited by the user.

In the preferred embodiment, when printing will be done by the output center, the image is sent through the communications network to the user system, the print page including the image is edited on the user system, the results of the edit (this may be only formatting information such as the arrangement, size, and color of images and text on the print page) are accepted by the user system and then a print request can be made to the output center on the basis of the results of the edit. The load on the image distributing system is lightened by editing the print page on the user system. Also, when editing is performed on the user system, images independently located on the user system can be added to the print page. In this case, the image distributing system receives images independently located on the user system, as well as the results of the edit, from the user system and sends these to the output center.

According to a third aspect of the present invention, a system for distributing images through a communications network to a user system comprises:

image transmission means for transmitting image data through a communications network to a user system; and editing means for sending a program for editing the print page including that image to the user system.

With this system, user does not need to have an editing program in advance because the editing program is sent, along with the image itself, to the user system.

According to a fourth aspect of the present invention, a system for distributing images through a communications network to a user system comprises:

image storing means for storing a plurality of images that can be distributed;

keeping list means for receiving the selection of desired images from a user system, generating keeping list information showing a list of selected images for each user, saving the keeping list information until after the connection with the user system is cut, and transmitting the keeping list information to the user system when requested after subsequently reconnecting with the user system; and downloading means for receiving the designation of images from the keeping list information from the user system, acquiring data for designated images from the image storing means, and transmitting this data to the user system.

With this image distributing system, even in the case of large numbers of images that can be distributed, a user can select desired images from among those and have that information saved as his or her own keeping list information on the image distributing system. The image distributing system saves the keeping list information of each user even after the connection with the user system is cut. When each user logs in again later, the system is caused by the user to reference the keeping list information for that user upon request from the user. The user can select and download preferred images from among his or her own keeping list information.

In the preferred embodiment, when images have distribution time limits and an image stored in the abovementioned keeping list information has a distribution time limit, that image is stored in the keeping list information until that distribution time limit passes (so long as the user does not delete the image on his or her own). Also, information indicating which images therein have already been downloaded is stored and displayed in the keeping list information.

In the preferred embodiment, in the case where it has become impossible to transmit in the future an image stored in the keeping list information (for example, when a limited period during which an image may be distributed has ended), images that have become impossible to transmit are automatically deleted from the keeping list information, or a notification to that effect is sent automatically to the user.

DESCRIPTION OF THE PREFERRED EMBODIMENTS

A preferred embodiment of the present invention is explained below. This embodiment relates to the distribution of a still image. From the following explanation of this embodiment, a person skilled in the art can easily understand that the principle of the present invention can also be applied to the distribution of various types of digital digital content such as moving images, sound, text, and the decryption thereof, in addition to still images.

Figure 1:
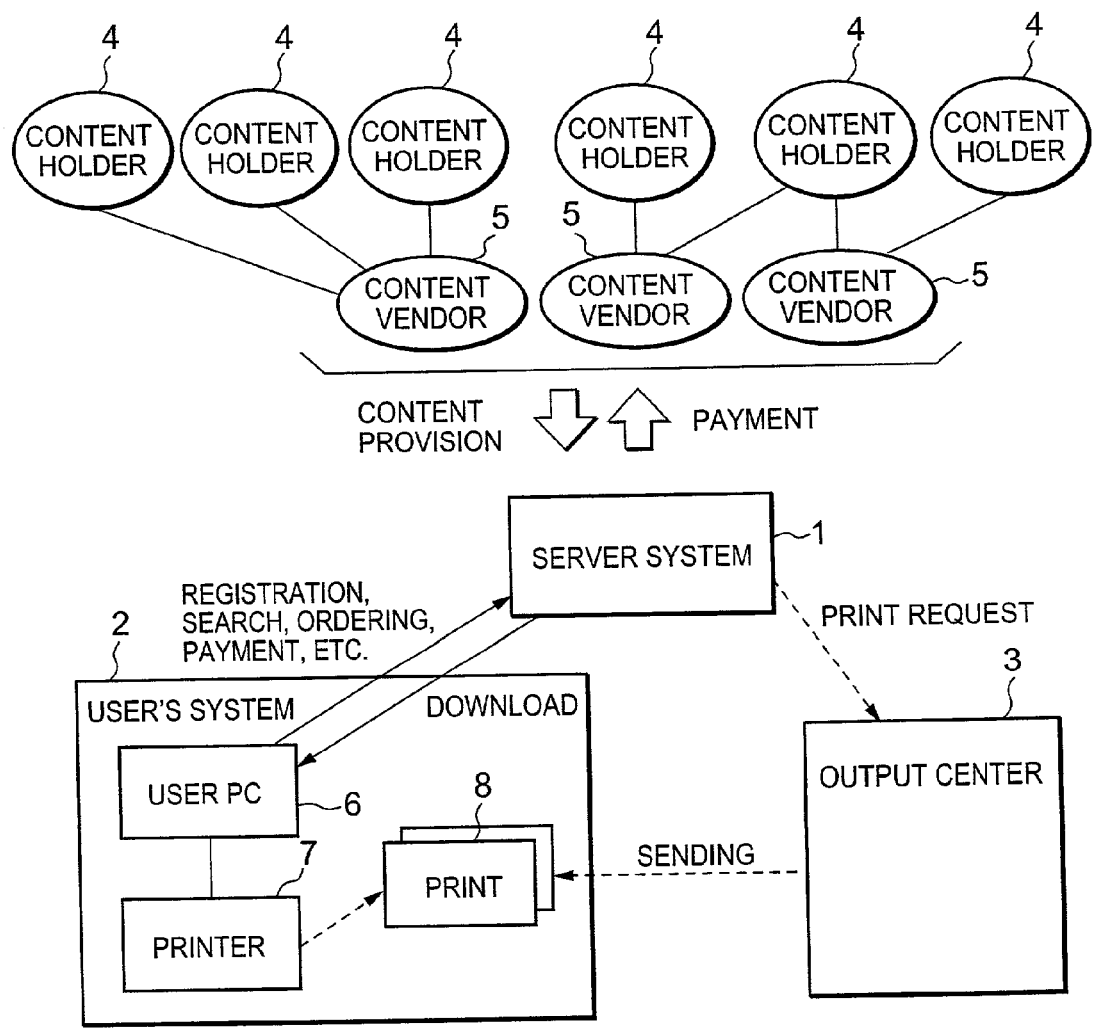
FIG. 1 is a block diagram showing the constitution of an embodiment of the present invention.

FIG. 1 shows the overall constitution of an image distribution system relating to the embodiment of the present invention.

A server computer system (hereinafter "server system") 1 for carrying out image distribution services is connected to a communications network, not shown, such as the Internet. A plurality of users can connect with the server system 1 through the Internet using individual computer systems (hereinafter "user system") 2. By connecting with the server system 1, each user can carry out the procedures necessary for receiving these services with the server system 1 online. These procedures include the following: member registration to the server system 1, searching for images, ordering images, downloading a special program called "image editor" in this specification, downloading images, and paying fees. The abovementioned image editor is a program for image editing and printing that is specially designed to make possible the online distribution of images while protecting the copyright of those images and will be discussed in detail below.

The user systems 2 for each user have different constitutions for each user, but typically are constituted with a personal computer (hereinafter "user PC") 6 having Internet connection functions and a printer 7 connected thereto. The abovementioned image editor is then installed on the user PC 6. The users can download desired images from the server system 1 using the image editors on their own user PCs 6, edit pages having desired layouts and designs including those images (for example, calendars or postcards), and print out those pages with their own printers 7.

This server system 1 also connects and is able to communicate with an output center 3 having advanced printing machines that are very expensive and difficult for an individual user to have. Instead of downloading images provided by the server system 1 to their own user systems 2 and printing them out themselves, the users can make an online request to the server system 1 so as to have those images sent from the server system 1 to the output center 3 and printed with the advanced printing machines of the output center 3. For example, users may select printing at the output center 3 when they want a large sized poster such as the B0 size, a very high quality print, or a large print run. The output center 3 sends the print 8 printed for the user to the user by mail or distribution service, for example.

Also, there is a large number of digital content holders (often the case even for copyright holders of images) 4, 4, . . . originally providing the images; and there is also a plurality of digital content vendors (for example, sales agents, etc.) 5, 5, 5 for acquiring approval from those digital content holders 4, 4, . . . and providing their images to the market. Those digital content vendors 5, 5, . . . and this server system 1 can communicate online through the Internet or the like, or offline by postal mail or the like. This server system 1 accepts and stores a plurality of images managed under copyright from the digital content vendors 5, 5, . . . and sells the images to users. Also, the server system 1 carries out processing for paying fees corresponding to the sales figures for each image to the digital content vendors 5, 5, . . . The images provided from the digital content vendors 5, 5, . . . to this server system 1 may also include public domain images. Images provided by the server system 1 to the user may be mostly for fees, but may also include some free images.

Figure 2:
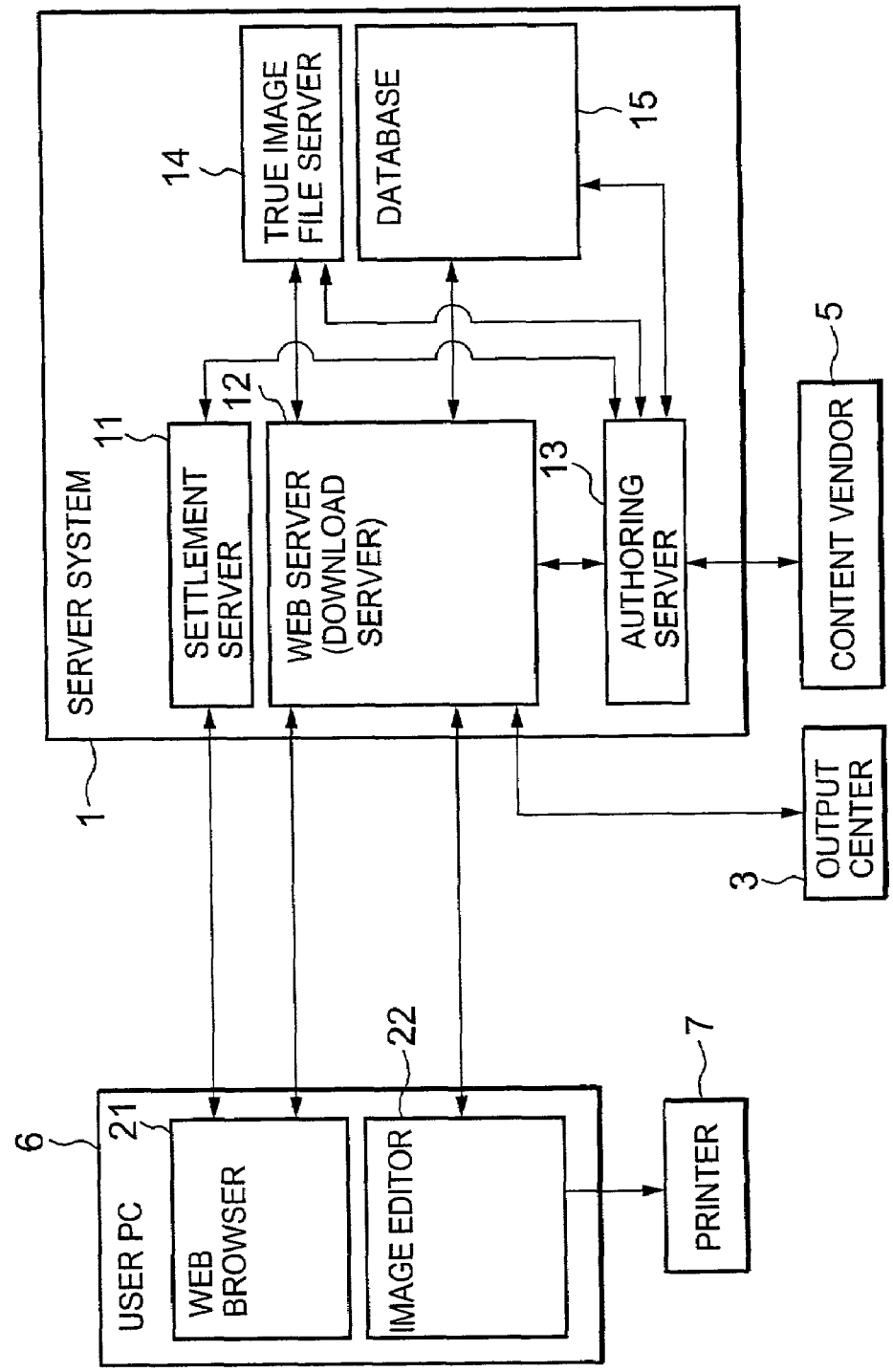
FIG. 2 is a block diagram showing the functional constitutions of the server system 1 and the personal computer 6 of the user.

FIG. 2 shows the functional constitutions of the server system 1 and the user PCs 6.

The server system 1 comprises a settlement server 11, a web (WWW) server 12, an authoring server 13, a true image file server 14, and a database 15. The user PC 6 comprises a web (WWW) browser 21 and an image editor 22. As discussed above, the image editor 22 can be installed on the user PC 6 by being downloaded from the server system 1, and may also be installed on the user PC 6 from a permanent storage medium such as a CD-ROM.

The settlement server 11 of the server system 1 carries out settlement processing for a user when the user orders a chargeable image from the server system 1. The web (WWW) server 12 carries out services such as the following for the user PC 6 through the Internet: member registration, image searches, selection of found images, downloading the image editor 22, downloading selected images, taking orders for downloaded images, and placing output requests to the output center. The authoring server 13 receives true image data for images provided from the digital content vendor 5 online or offline; generates compressed images of various sizes (discussed in detail below) such as thumbnail images, preview images, and layout images from that true image; registers the thumbnail images, preview images, layout images, and so forth to the web server 12; and registers the true image to the true image file server 14. The true image file server 14 stores and manages true image data for images provided. The database 15 stores and manages various data required by the server system 1, such as the following: personal data such as the names and addresses of each member, the image keeping list of each member (discussed in detail below), company data such as the names and addresses of each digital content vendor, a compression program for the image editor 22, and data for settlement.

The web browser 21 on the user PC 6 is used for member registration, image searches, image selection, downloading the image editor 22, and requesting prints from the output center with the web server 12 on the server system 1, and for settlement processing for image fees with the settlement server 11. The image editor 22 is used for downloading images and ordering images with the web server 12 of the server system 1, and for editing pages including the downloaded images and generating print jobs of the edited images for the printer 7.

Following are the basic and general procedures for the user to acquire prints of images from the server system 1.

(1) The user accesses the web server 12 using the web browser 21, goes through member registration, downloads the image editor 22, and installs the editor on the user PC 6. The image editor 22 may be downloaded automatically or intentionally by the user. For example, when the user starts the image editor 22 in a subsequent procedure, the image editor 22 will be automatically downloaded, installed, and started if not already installed on the user PC 6.

(2) The user accesses the web server 12 using the web browser 21 and searches for and selects a desired image. The user does not only make the selection by viewing a small sized thumbnail image, but may also determine whether the selected image is interesting using a preview image containing less data than the true image, but of a larger size than the thumbnail. When the preview image is displayed, text including an explanation of the image and the usage restrictions according to the copyright are displayed along with the image. Also, the thumbnail image of a selected image, and the explanation and usage restrictions according to the copyright are saved in the image keeping list for that user and can be used even at the same time by opening the image keeping list. Because of this, the user can definitely and simply select images of interest.

(3) When the user wants to have a selected image printed by the output center 3, the user makes a request to that effect to the web server 12 using the web browser 21 and carries out the associated membership authentication process and image fee settlement process. When the member authentication and settlement processes are completed normally, the web server 12 sends the print request for that user to the output center 3.

(4) When the user wants to print the selected image on his or her own printer 7, the user starts the image editor 22, downloads the layout image, which is a compressed version of the true image for the selected image, from the web server 11 using the image editor 22, and edits the layout and design of the print object page (for example, a calendar or postcard) using that layout image. The following controls are carried out in order to protect the copyright for the image. Specifically, the web server 11 does not send the layout image when accessed by a program other than the image editor 22. Also, the image data sent by the web server 11 to the image editor 22 is encrypted with a method that can only be decrypted by the image editor 22, and can be viewed by the user when decrypted by the image editor 22. Furthermore, the web server 11 does not send only the image itself to the image editor 22 and also sends control data indicating the usage restrictions according to the copyright for that image (for example, whether various types of editing, such as layout editing or reduction and enlargement are possible, or whether the usage period is limited) to the image editor 22. The image editor 22 allows the user only those editing operations allowed by the control data.

(5) When editing with the image editor 22 is finished, the user sends an order for the selected image to the web server 12 using the web browser 21 and also carries out the associated membership authentication process and image fee settlement process.

(6) When the member recognition process and settlement processes are finished, the user downloads the true image for the selected image from the web server 11 using the image editor 22, embeds that true image and an edited layout or design in a page, and prints that page with the printer 7. The following controls are carried out here in order to protect the copyright. If the member recognition process and settlement process are not completed normally, the web server 11 does not send the true image to the image editor 22 (or, the true image is sent from the web browser 11 to the image editor 22 before the member recognition process and settlement process are completed, but the image editor 22 cannot print the true image normally if the member recognition process and settlement process are not completed). Also, the web server 11 does not send the true image if accessed from a program other than the image editor 22. Also, the true image sent from the web server 11 to the image editor 22 is encrypted with a method that can only be decrypted by that image editor 22 and therefore the image editor 22 is the only way to decrypt the image. Also, the image editor 22 does not output the decrypted true image outside of the image editor 22 with a method other than printing (for example, sending the true image data to another application, or outputting the data to an external storage device). Furthermore, the image editor 22 cannot print out the true image in a layout or design other than the results of editing using the layout image. An electronic watermark displaying the details of the copyright such as the name of the copyright holder is inserted in the true image provided by the web server 11 and the electronic watermark is printed out along with the true image.

The function and operation of each portion are explained below in detail.

Figures 3, 4:
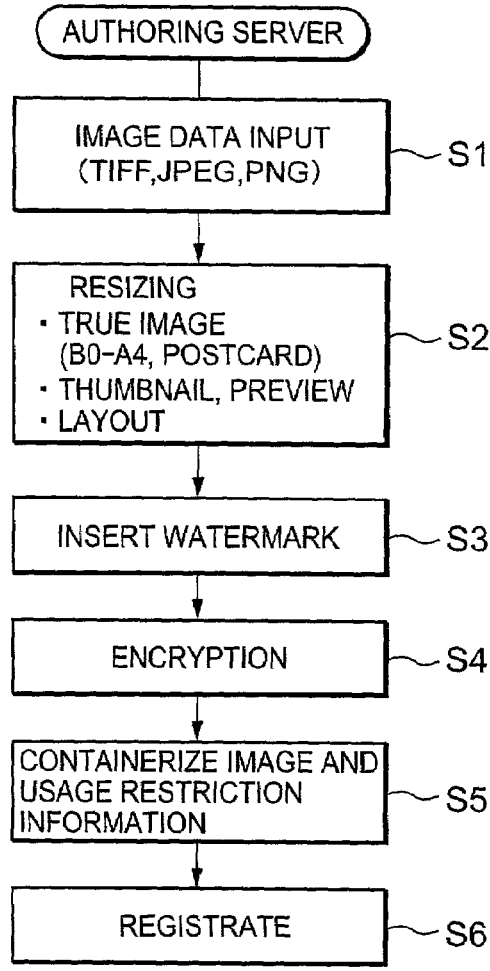
FIG. 3 is a flowchart showing the process flow in the server system 1 for the registration to this server system 1 of an image received by the authoring server 13 from the digital content vendor 5.
FIG. 4 is a drawing showing the relationship of the print size of the true image to the resolution.

FIG. 3 shows the process flow for the authoring server 13 to register an image received from the digital content vendor 5 to this server system 1.

The authoring server 13 inputs data for the image provided by the digital content vendor 5 (Step S1). The data format of this image data may be any of various formats such as TIFF, JPEG, PNG, and so forth. For example, it may be useful for the image data for an animation character to be PNG, which is a format appropriate for overlaying with another image, if the purpose is to print out a photograph that looks as if the animation character and user are beside each other.

The authoring server 13 resizes the input image data to a plurality of specified sizes (S2). Specifically, the authoring server 13 generates true image data in six print sizes such as postcard, A4, A3, A2, B1, and B0. Here, the true image is the image that is actually used for printing. For this reason, the true image has a high resolution so that the printed version has a sufficiently high image quality. Next, the authoring server 13 generates three types of image data, a thumbnail image, a preview image, and a layout image. Here, the thumbnail image has the number of pixels to appear 2 to 3 cm on a side on the monitor screen because it is used when displaying a list of a plurality of images on the computer monitor screen. The preview image is an image for the user to confirm the image design on the monitor screen and therefore has the number of pixels (greater than the thumbnail image) to appear 5 to 7 cm on a side on the monitor screen. The layout image is an image to be placed in a print page for editing the layout and design of the page and therefore has the number of pixels so as to be displayed in an even larger size than the preview image on the monitor screen, but contains less data than the true image.

Next, the authoring server 13 inserts an electronic watermark indicating the details of the copyright, such as the name of the copyright holder, in the images of various sizes created in the resizing discussed above (S3). The electronic watermark may be inserted in all of the images: the true image, the thumbnail image, the preview image, and the layout image, but the electronic watermarks need not be inserted in image data that is too small, such as the thumbnail image, to result in actual copyright issues. However, the electronic watermark is at least inserted in the true image that will be printed.

Moreover, instead of the authoring server 13 inserting an electronic watermark in the image data, the image editor 22 may also insert the electronic watermark in that data when the image is printed. In the case where the image editor 22 inserts the electronic watermark, the image editor can select a location, depending on the page layout so that the electronic watermark will be effectively displayed, when the editing of the page layout is finished and just before printing begins, and insert the electronic watermark in the print data. Particularly when a plurality of images is printed on the same page, and in the case where those images will be laid over each other, there is a risk that the electronic watermarks will overlap and interfere with each other and no longer function as electronic watermarks even if an electronic watermark is embedded in a fixed location in each of the images. Even this case, the abovementioned problem can be avoided when the image editor 22 adjusts the locations so that the electronic watermarks of a plurality of images do not overlap and embeds those electronic watermarks in the print data according to the page layout directly before printing.

Next, the authoring server 13 encrypts the layout image and true image data to be provided to the image editor 22 with a method that can only be decrypted by the image editor 22 (S4).

Next, the authoring server 13 adds and containerizes control data to indicate the usage restrictions according to the copyright with the encrypted true image (S5). Also, prescribed supplementary data are added to images other than the true image, such as the thumbnail image, preview image, and layout image. For example, explanatory text such as the shop name and price to be displayed along with the thumbnail image when displayed on the monitor screen are added to the thumbnail image. Explanatory text such as the shop name and price to be displayed along with the preview image when displayed on the monitor screen, and control data showing usage restrictions according to the copyright are added to the preview image. Control data showing usage restrictions according to the copyright are added to the layout image.

Usage restrictions according to the copyright include the following, for example: whether the image is chargeable or free, whether the image may be printed with the user's printer, whether the image may be printed at the output center, whether the image may be inserted in a page such as a calendar or postcard and the layout and design of that page edited, whether various types of editing may be performed on that image itself (for example, enlargement or reduction, overlaying with another image, etc.), whether there are images that may not be displayed on the same page, until when the image may be printed, any restrictions to print size, the maximum number of pieces that may be printed at one time, and whether either color printing or black and white printing is acceptable.

The control data appended to the preview image is used so that the web server 12 limits the choices when the user selects whether to print that image with the output center or his or her own printer, or the web server 12 limits the purposes and print sizes that can be designated when the user indicates the purpose and print size for that image (such as for a calendar or postcard). As already discussed, the control data appended to the layout image is used so that the image editor 22 limits the types of editing operations and print actions that can be executed when the user uses the image editor 22 to edit the layout and design of the print page including that image, and so that the image editor 22 limits the print sizes and numbers of prints when that image is printed on the basis of those editing results.

Next, the authoring server 13 registers the container of the true data and the abovementioned various types of image data to the true image file server 14 and web server 12 (S6). The container of the true data is registered to the true image file server 14. A table showing the relationship between the identification of the true image data and the storage location in the true image file server 14 is stored in the database 15. The thumbnail image, preview image, and layout image are registered to the web server 12.

FIG. 4 shows the resolution of the true image in various print sizes generated by the authoring server 13 in Step S2 in FIG. 2. As shown in FIG. 4, the resolution becomes higher as the print size of the true image becomes smaller and therefore the quality of the print increases. This is because higher image quality is required for smaller prints since small prints are viewed from close up and large prints are viewed from a distance.

Figure 5:
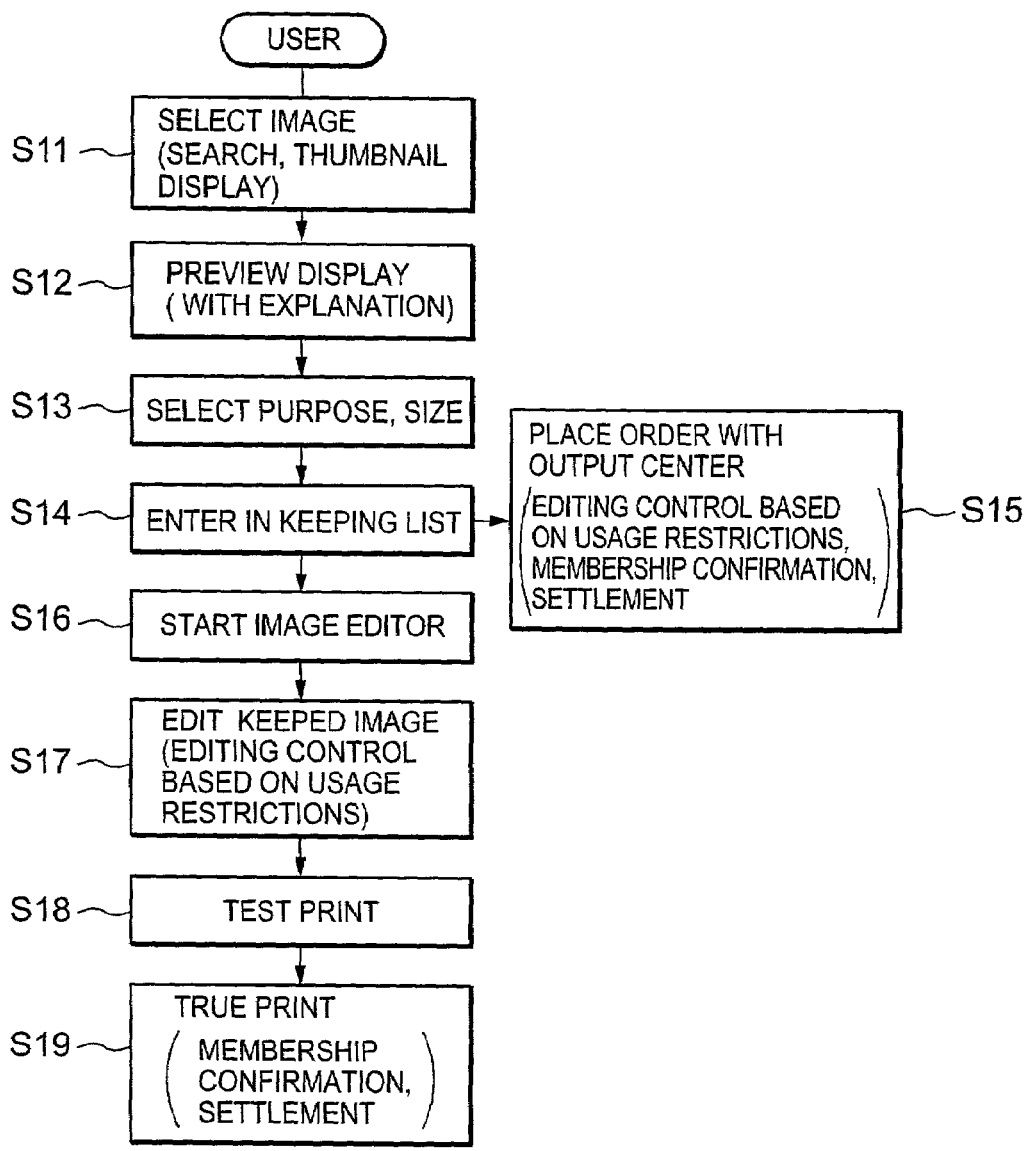
FIG. 5 is a flowchart showing the general procedures from when the user searches for a desired image until print out.

FIG. 5 shows the general procedures from the search for a desired image until it is printed, with the user accessing the web server 12.

The user searches for an image that matches desired conditions from the search screen provided by the web server 12 (S11). The search results are displayed in the list of thumbnail images that matched the conditions. Next, the user selects one image from the list of thumbnail images (S11). Thereupon, the preview image of the selected image is displayed (S12). Text indicating the usage restrictions and a caption for that image, as well as a menu for designating the use and print size for that image are displayed in association with the preview image. If the user views the preview image and becomes interested in that image, the user designates the purpose and size, and adds that image to the keeping list for that user which is provided by the web server 12 (S14). The keeping list is stored on the web server 12 and the user can access his or her own keeping list at any time. The user can select images he or she wants to print from his or her own keeping list.

When the user wants to have an image from the keeping list printed by the output center 3, the user selects that image from the keeping list and carries out various operations to make a print request to the output center on the screen provided by the web server 12 (S15). In this process, the user can add the selected image to a print page on the screen provided by the web server 12 and edit the layout and design of that page. At this time, however, the user can only carry out those editing operations allowed for the selected image. In this process, the user also carries out the member authentication and image fee settlement processes on the screen provided by the web server 12. Once the member authentication and image settlement are completed normally, the print request is sent from the web server 12 to the output center 3. The print printed at the output center 3 is sent to the user by means such as postal mail or distribution service.

When the user wants to print an image in the keeping list on his or her own printer 7, the user starts the image editor 22 on his or her own user PC 6 with an operation on the screen provided by the web server 12 (S16). The keeping list is then displayed on the screen of the image editor 22 and the user selects the image he or she wants to print from that keeping list. Thereupon, the image editor 22 downloads the layout image of the selected image from the web server 12 and displays that layout image on the editing screen. The user then uses the layout image on the editing screen of the image editor 22 and edits the layout and design of the print page. In this editing work, only those operations allowed according to the control data appended to the layout image can be performed.

Figure 6:
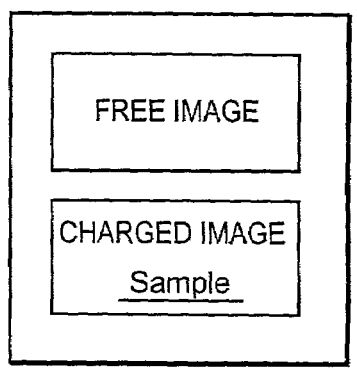
FIG. 6 is a drawing showing an example of a character string printed over the image in a test print.

When the page edit is complete, user can command the image editor 22 to make a test print (S18). The image editor 22 uses the data of the page edited using the layout image, generates print job data for a test print, and sends the data to the printer driver of the printer 7. In the test print, as illustrated in FIG. 6, at least those images requiring management according to the copyright and chargeable images within a page are printed with an overlay of prescribed extraneous text or marks, such as "sample". For this reason, the test print cannot be practical to use. In the example in FIG. 6, the public domain, free images are not printed with the "sample" characters, but it does not matter if those are also printed with "sample" characters thereon. The "sample" text may be printed in multiple locations, not only in one location, and may be printed over the entire page. The color thereof is preferably varied among several colors according to the color of the image, so as not to match the color of the image.

Moreover, the test print may be performed at the same way for images to be printed at the output center. Images to be printed at the output center include large sizes that cannot be printed on a user's printer. In a test print thereof, however, these will be reduced and printed in a size such as A4, for example, that can be printed with the user's printer. In this case as well, a mark such as "sample" will be overlaid and those prints will be made inappropriate for practical use.

If the results of the test print are satisfactory, the user can command the image editor 22 to start the processing for a true print (S19). The true print may be made directly after the test print, or later. The image editor 22 and web browser 21 can be temporarily shut down and the image editor 22 and web browser 21 may be started up again and the true print made at a later opportunity. The image editor 22 stores the keeping list that was last downloaded and the editing results of the last page layout made. Therefore, even when the image editor 22 is temporarily shut down and then started up later, the true print can be made under the same conditions as when the true print is made directly after the test print. In the processing for the true print, the member authentication and image fee settlement processes are carried out with the web server 12 using the web browser 21 before downloading the true image. When the member authentication and settlement processes are complete, the web server 12 authorizes the image editor 22 to download the true image, and therefore the user downloads the true image from the web server 12 using in the image editor 22. Then, using the image editor 22, the user prints the downloaded true image with his or her own printer 7 according to the previous editing results.

The processing from the image search until printing, as shown in FIG. 5, is explained below from the perspective of how the monitor screen of the user PC 6 transitions.

Figure 7:
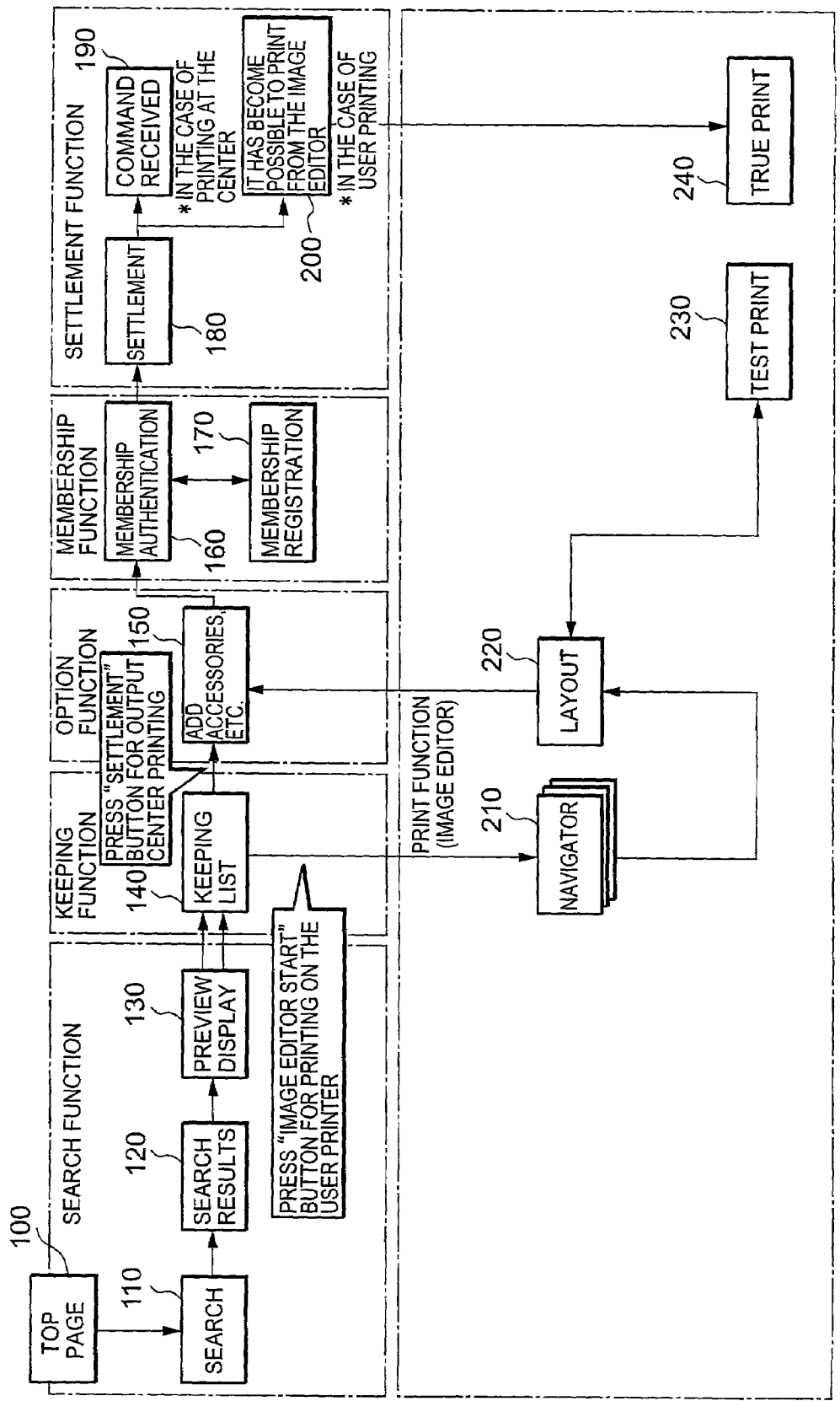
FIG. 7 is a flowchart showing the overall summary of the transitions of the monitor screen of the user's PC 6.

FIG. 7 shows an overall summary of the transitions of the monitor screen of the user PC 6.

In FIG. 7, the upper level series of dotted line blocks including the search function, keep function, option function, membership function, and settlement function shows the general screen functions of the web server 11 that the user can use from the web browser 21. The solid line blocks within these dotted line blocks show more detailed screen functions. Also, the lower level dotted line block with the print functions is a function of the image editor 22 on the user PC 6; the solid line blocks therein show detailed functions.

Aspects of specific screen transition for each of the screen functions shown in FIG. 7 are shown in FIGS. 8 through 16.

The following explanation references FIG. 7 and FIGS. 8 through 16.

As shown in FIG. 7, the top page 100 is first displayed when the web server 12 is accessed from the web browser 21. The image search 110 can be input from the top page 100. When this search 110 is ended, the search results 120 are displayed; when one image from the search results 120 is selected, the preview display 130 for that selected image is carried out.

Figure 8:
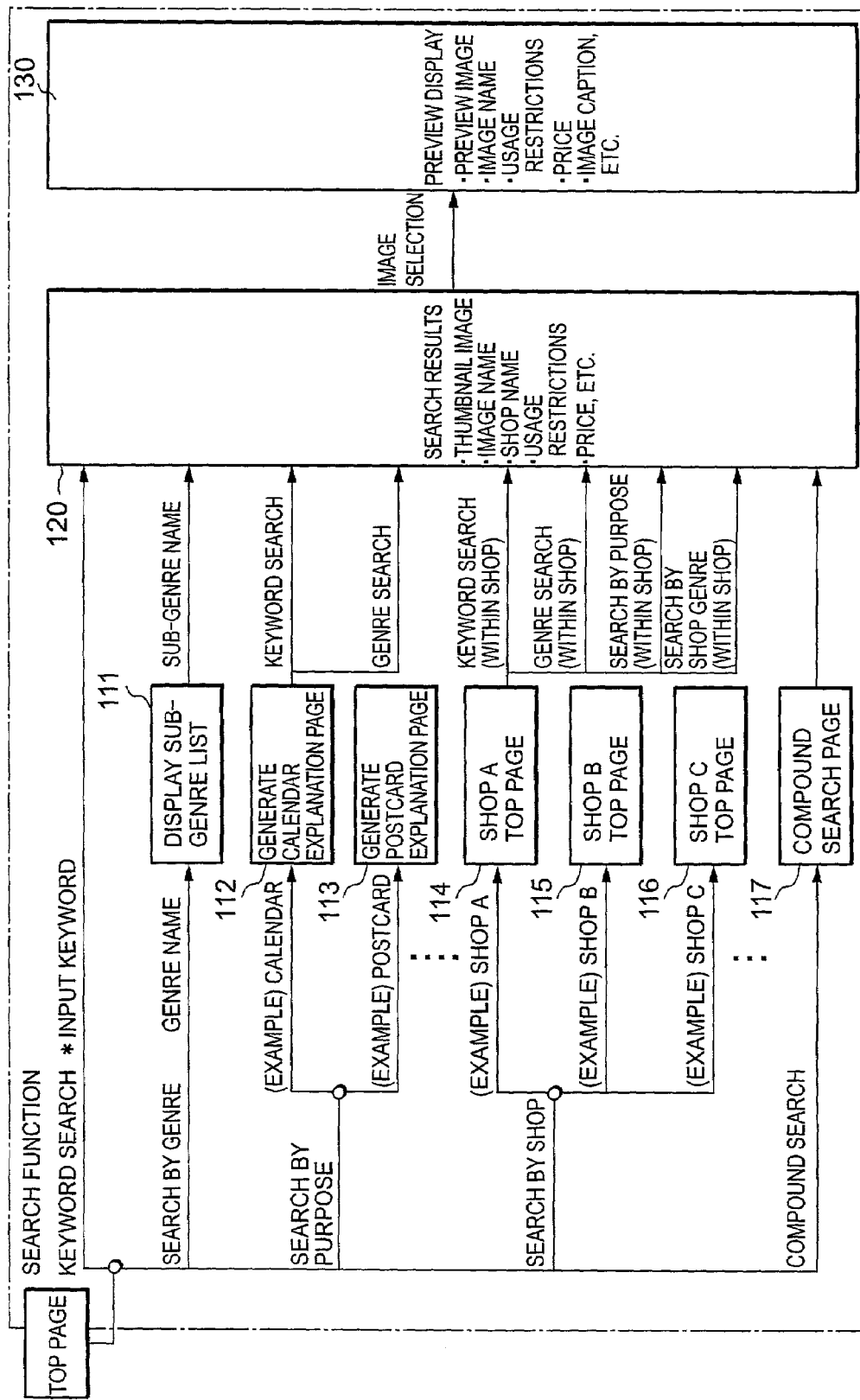
FIG. 8 is a flowchart showing the transitions of the screen when an image search is performed.

As shown in FIG. 8, this search 110 may include keyword searches, image genre searches (for example, performers, movies, illustrations, etc.), image purpose search (for example, calendar, postcard, or printing as is, etc.), shop search (for example, performance productions, artists, character companies, etc.), or compound searches that are a combination of those. A list of thumbnail images of the images found is displayed in the search results 120. Appended to each thumbnail image, the image title, name of the shop that provided the image, an explanation of usage restrictions according to the copyright, price, and so forth are displayed together therewith. When the user clicks one thumbnail image from the list of thumbnail images of the search results 120 with a mouse click or the like, the preview display 130 for that image is carried out. In the preview display 130, the preview image for that image (larger than the thumbnail image) is displayed and the appended image title, name of the shop that provided the image, an explanation of usage restrictions according to the copyright, the price, and a caption for the image are displayed together therewith.

Figure 9:
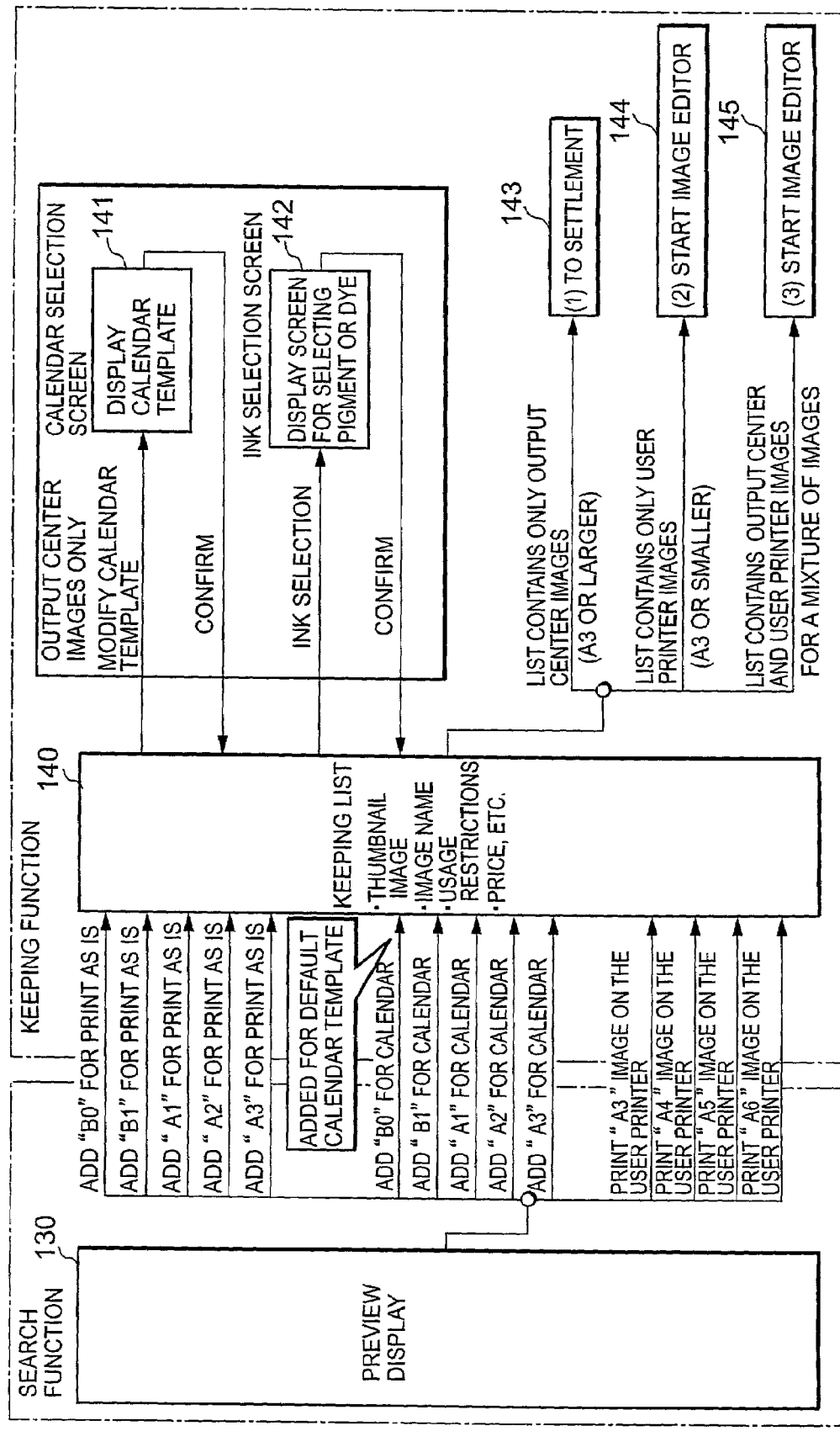
FIG. 9 is a flowchart showing the transitions of the screen when an image is placed in the keeping list.

With reference to FIG. 7 once more, the keeping list 140 is displayed next if the user carries out an operation to place that selected image in the keeping list 140 in the screen for the preview display 130. When the selected image displayed in the preview display 130 is entered in the keeping list 140, the user designates the following at the same time, as shown in FIG. 9: whether to print that selected image at the output center or on the user's printer, the purpose (for example, printing as is, calendar, postcard, etc.), and print size (for example, postcard, A5 to B0, etc.). At that time, the web server 12 controls the scope of items that the user can designate according to the control data appended to the preview image of the selected image. For example, if use of the selected image in a calendar or postcard is prohibited, then it will be impossible to designate calendar or postcard as the purpose. Also, the web server 12 may automatically determine whether to print at the output center or on the user's printer according to the print size designated by the user. For example, print sizes larger than the A3 size will be printed at the output center, print sizes less than the A3 size will be printed on the user's printer, and the user can select where to print the A3 size.

The thumbnail image, image title, explanation of usage restrictions, price, and so forth are displayed in the keeping list 140 for images already entered therein and newly added images. Also, the preview image may be displayed instead of the thumbnail image on the keeping list 140. It is also possible for an image of a separate size (for example, a palette image of a size between that of the thumbnail image and the preview image) applied to the keeping list 140 to be generated in the resizing process (FIG. 3, Step S2) on the authoring server 13, registered to the web server 12, and displayed on the keeping list 140.

In the case where any of the images already entered in the keeping list 140 becomes such that it cannot be distributed to the user in the future (for example, when the period in which that image can be distributed is limited and that period has ended), an image whose distribution is halted automatically on the server system 1 is automatically deleted from the keeping list 140, and a message to that effect is automatically sent to the user system 2 (for example, a message to that effect is displayed on the keeping list 140).

As shown in FIG. 9, an image that has been designated for calendar use and entered in the keeping list 140 is entered in the keeping list 140 in a form wherein the image is embedded in the default calendar template. For one of those images that is to be printed at the output center, the process advances to the process for the calendar template display 141 if the default calendar template is not appealing to the user, and another calendar template can be applied (in the case of printing on the user's printer, that template can be freely established later using the image editor 22). For an image to be printed at the output center, regardless of its purpose, the process advances to the ink selection screen 142 and dye and pigment inks appealing to the user can be indicated as the ink to use in printing at the output center.

Next, as shown in FIG. 9, the user can click the "To settlement" button (Step 143), or the "Start image editor" button (Step 144 or 145) on the keeping list 140. In the case where the images in the keeping list 140 are all images to be printed at the output center, only the "To settlement" button (Step 143) can be clicked. In the case where the images in the keeping list 140 are all images to be printed on the user's printer, only the "Start image editor" button (Step 144) can be clicked. In the case where images to be printed at the output center and images to be printed on the user's printer are mixed together in the keeping list 140, the user basically clicks the "Start image editor" button (Step 145).

Figure 10:
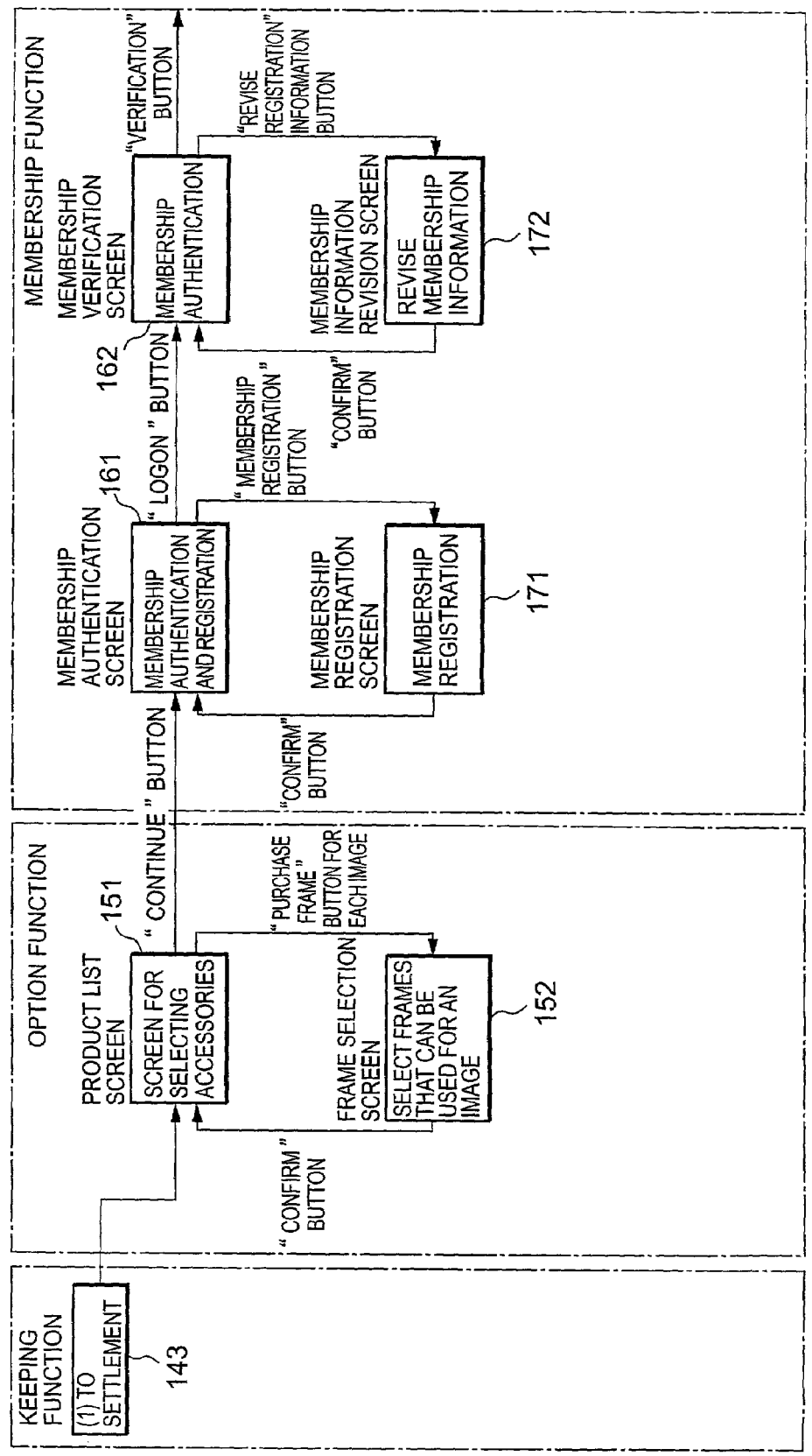
FIG. 10 is a flowchart showing the transitions of the screen until membership authentication when all images are to be printed by the output center.
Figure 11:
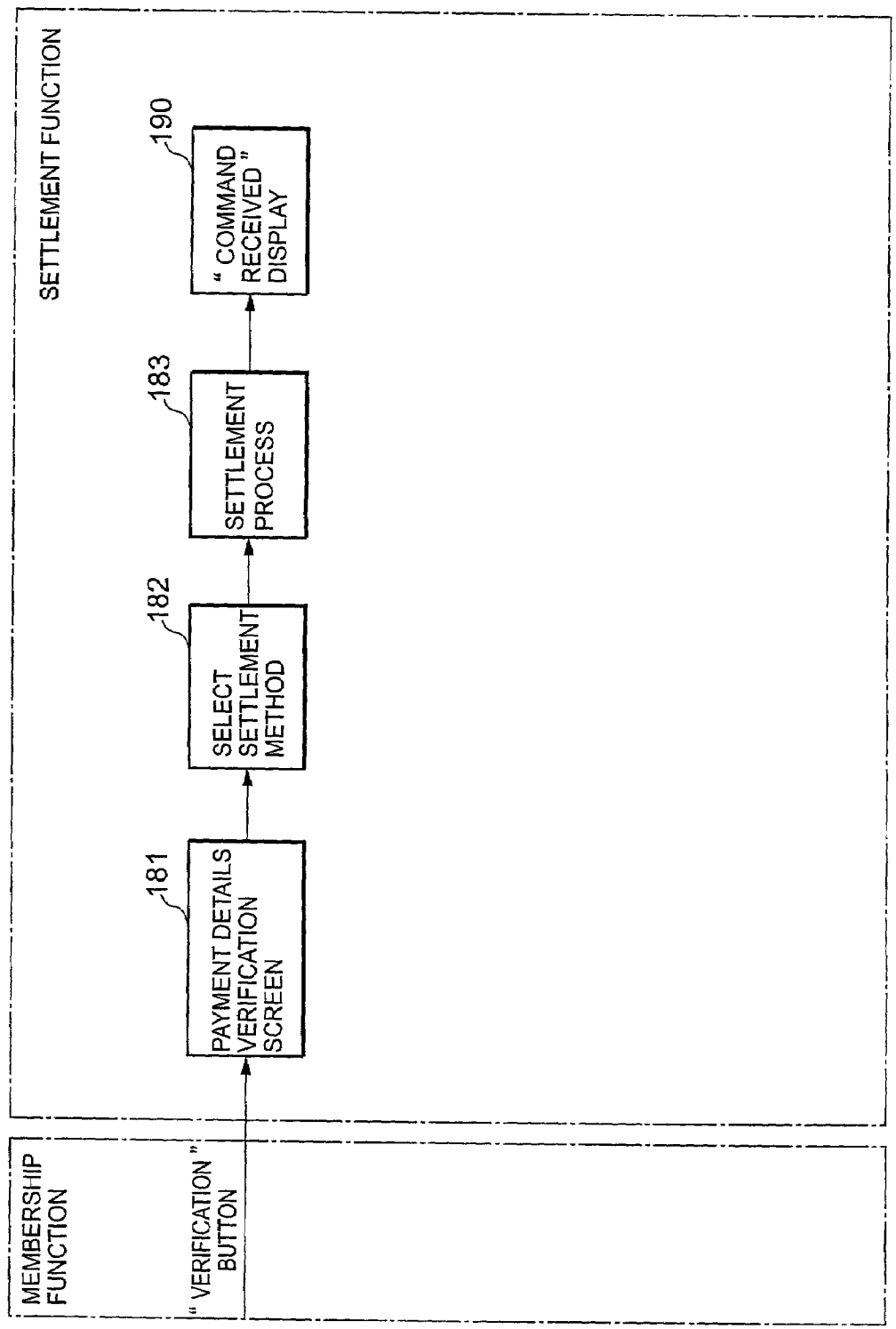
FIG. 11 is a flowchart showing the transitions of the screen in the settlement process when all images are to be printed by the output center.

When the "To settlement" button is clicked from the keeping list 140, the process advances to the following functions in order: option function, membership function, and settlement function as shown in FIG. 7 (or as shown in detail in FIGS. 10 and 11). As shown in FIG. 7, the process for adding associated items or the like 150 is carried out with the option function. Next, the process for a membership authentication 160 (membership registration 170 is also carried out if the user is not yet a registered member) with the membership function; the process for settlement 180 is carried out with the settlement function, and when that is finished, a print request is sent to the output center and the "Command received" screen 190 is displayed.

Specifically, as shown in FIG. 10, when the "To settlement" button is clicked, the process advances to the product list screen 151; various types of accessories that can be bundled with the print product at the output center can be selected here. It is also possible to select a frame for the print by clicking the "Purchase frame" button and advancing to the frame selection screen 152. When the "Continue" button is clicked on the product list screen 151, the membership authentication screen 161 is displayed and the user carries out membership authentication by inputting his or her membership ID and password. Users who are not members continue to the member registration screen 171 and go through member registration procedures, and then carried out membership authentication on the membership authentication screen 161. Upon authentication as a member, the member verification screen 162 is opened and registration information such as the user's address, name, telephone number, email address, and so forth are displayed and the user verifies this. In the case of changing the registration details, the user advances to the member information revising screen 172 and enters the new registration items there.

If the registration items on the membership authentication screen 162 are correct, the user clicks the "Verification" button. Thereupon, as shown in FIG. 11, the payment itemization confirmation screen 181 is displayed. The user verifies the payment itemization, and then advances to the settlement method selection screen 182 where the user selects a settlement method such as credit card, bank transfer, or the like; the user then advances to the settlement process screen 183 and executes the settlement process. When the settlement process is finished, the print request is sent from the web server 12 to the output center 3 and the "Command received" screen 190 is displayed on the web browser 21.

Although not shown in the flowchart, a test print can be made on the user's printer before the print request is made to the output center 3, as in the case discussed below where the user makes the print him or herself. In that case, large sized images, such as the B0 size in particular, are reduced to a size such as the A4 size that can be printed on the user's printer and are test printed.

Although also not shown in the flowchart, in the case discussed below where the user edits the page layout using the image editor 22, a print can be requested from the output center 3 instead of this being printed on the user's printer.

With reference to FIG. 9 once more, the image editor 22 on the user's PC 6 is started when the "Start image editor" button is clicked from the keeping list 140 (Step 144 or 155). Thereupon, as shown in FIG. 7, the navigator 210 functions in the image editor 22 and various types of print uses such as the purpose and template selection are set by the user with a prescribed sequence. Thereafter, the software moves to the layout process 220 and the user can edit the layout and design of the print page. When the layout process 220 is finished, the user can make the test print 230.

When the layout process 220 is finished, the true print can also be made. In order to make a true print, the user returns once to the screen of the web browser 21, advances to the process to add accessories 150, and then carries out the processing for member authentication 160 and settlement 180. When membership authentication 160 and settlement 180 are ended, the screen 200 "It has become possible to print with the image editor" is displayed on the web browser 21 and the image editor 22 is authorized to make a true print 240 (until then, the image editor 22 could not make the true print 240). The user then initiates the true print 240 on the image editor 22 and prints the true image.

After membership authentication 160 and settlement 180 are finished and the true print 240 is authorized, the true image data used in the true print 240 are downloaded from the web server 12 to the image editor 22. This is not necessarily the case, however. In another method, for example, the data for the true image are downloaded to the image editor 22 at the time of the test print 230 (or before that time), and the true print as well as the test print may be made with the true image. In this case, the print output for the test print is overlaid with a character string such as "sample", but except for that is the same as the true print, and the precision of the test print becomes good.

Figure 12:
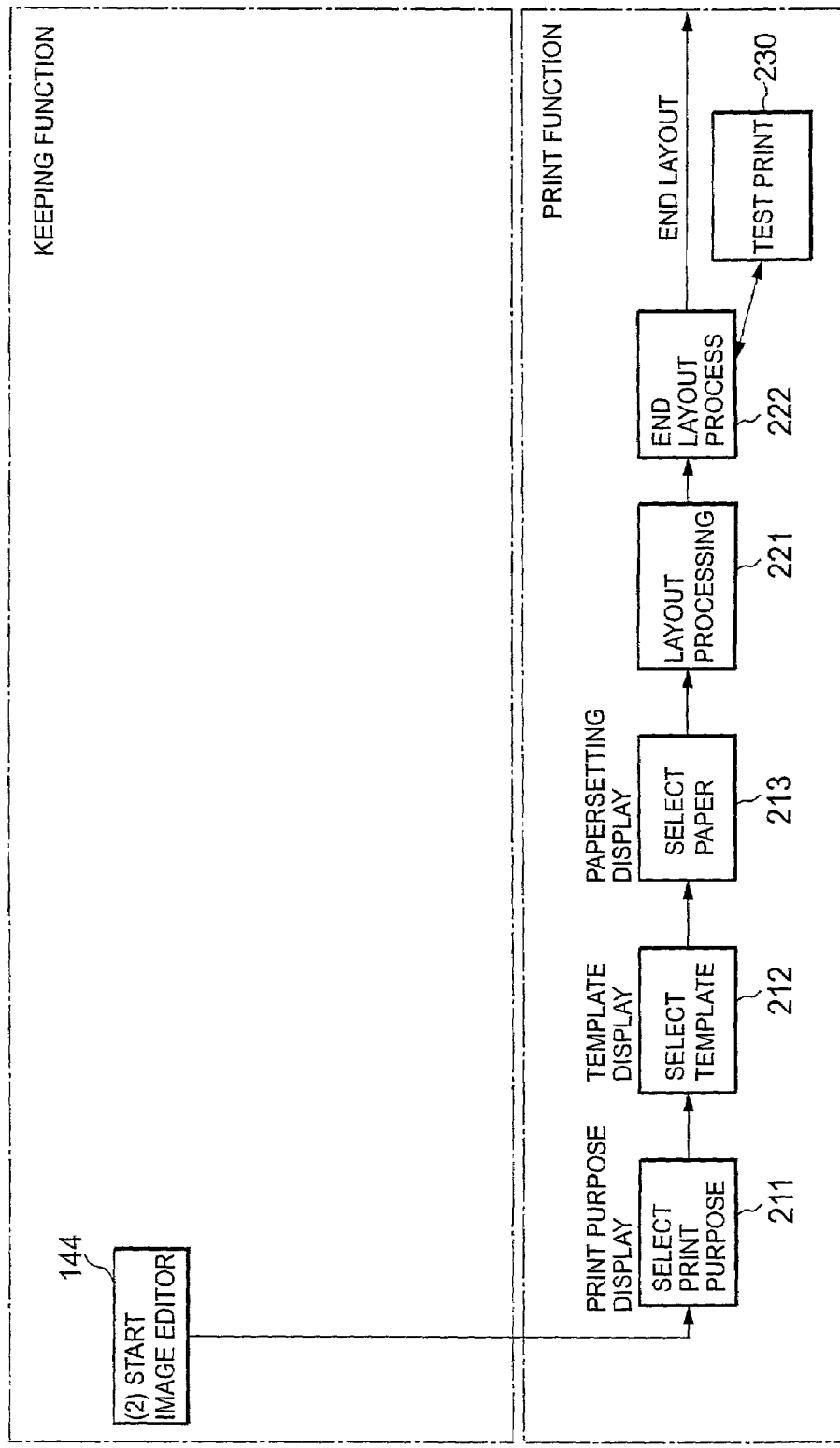
FIG. 12 is a flowchart showing the transitions of the screen of the image editor when all images are to be printed with the user's printer.
Figure 13:
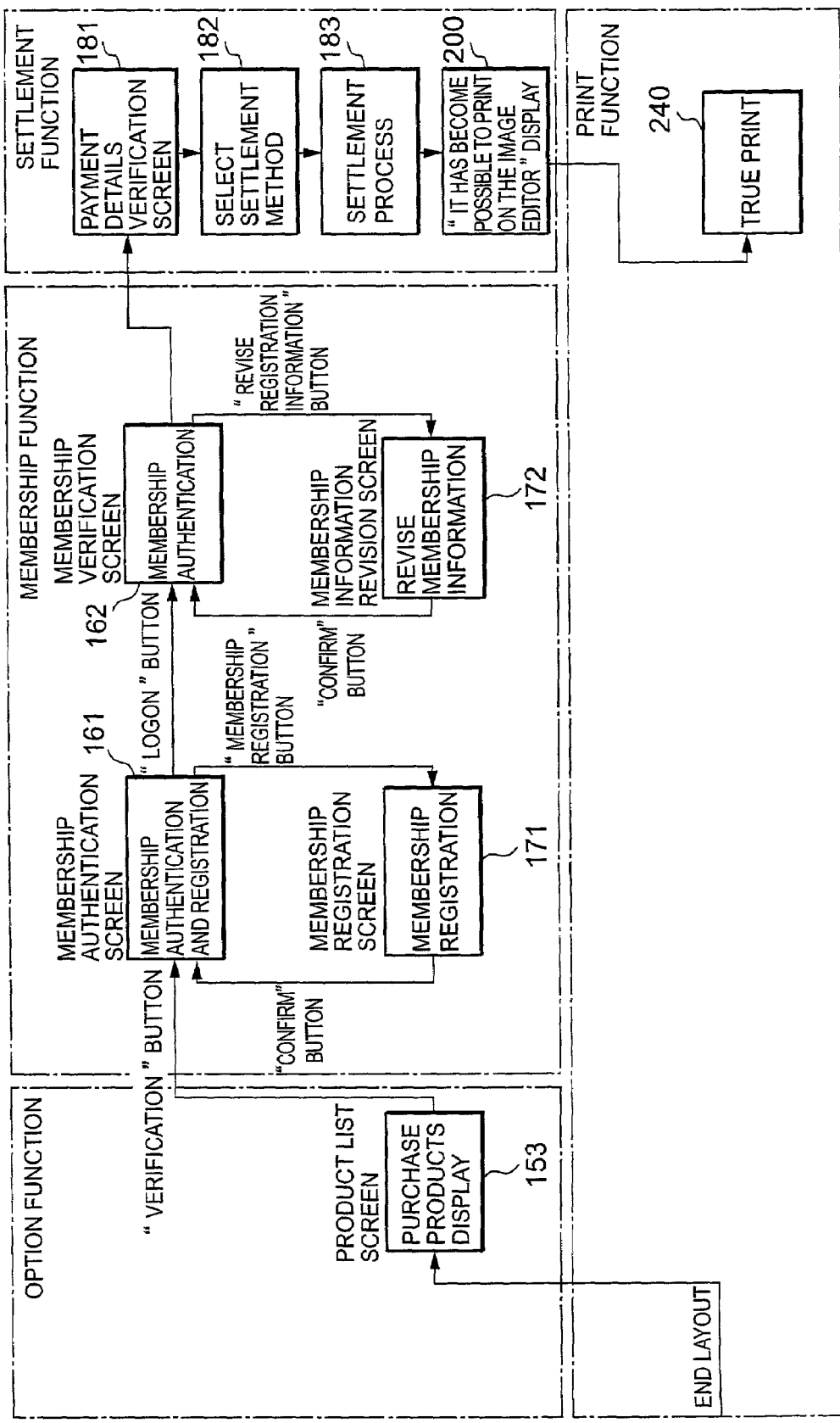
FIG. 13 is a flowchart showing the transitions of the screen from the end of editing until the true printing when all images are to be printed with the user's printer.
Figure 14:
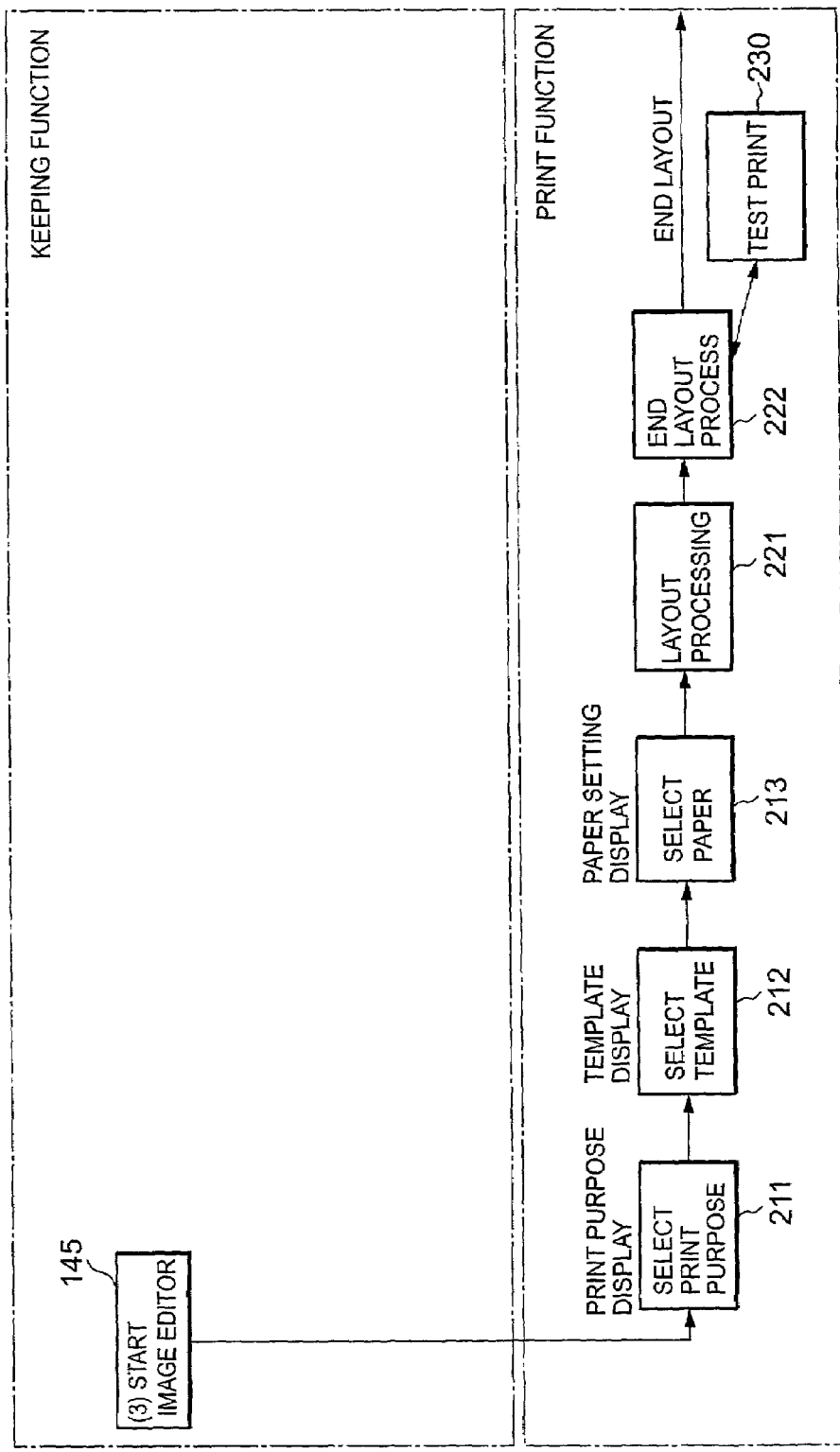
FIG. 14 is a flowchart showing the transitions of the screen of the image editor when one image is printed by the output center and another image is printed with the user's printer.
Figure 15:
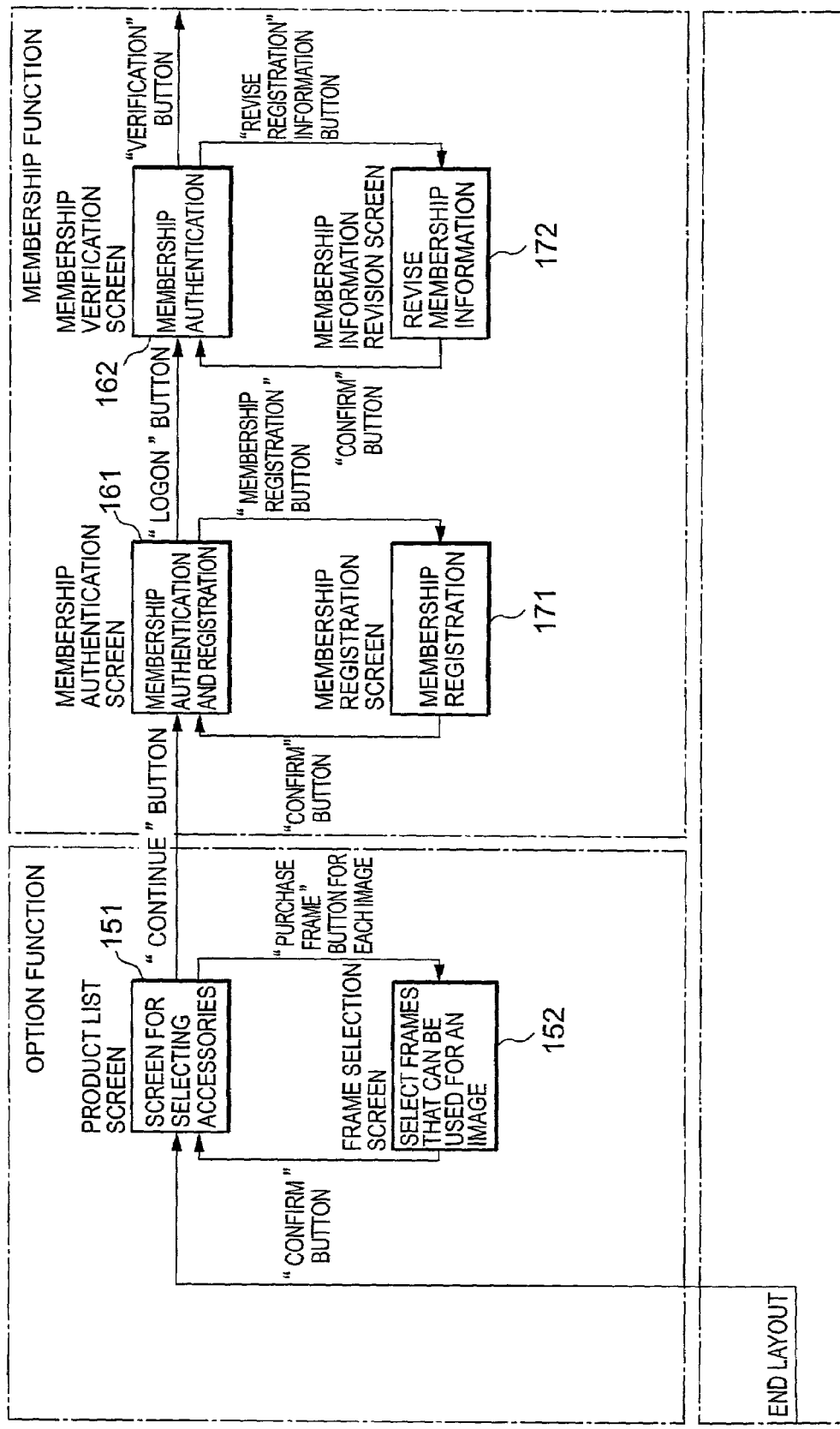
FIG. 15 is a flowchart showing the transitions of the screen until membership authentication when an image is printed by the output center and another image is printed with the user's printer.
Figure 16:
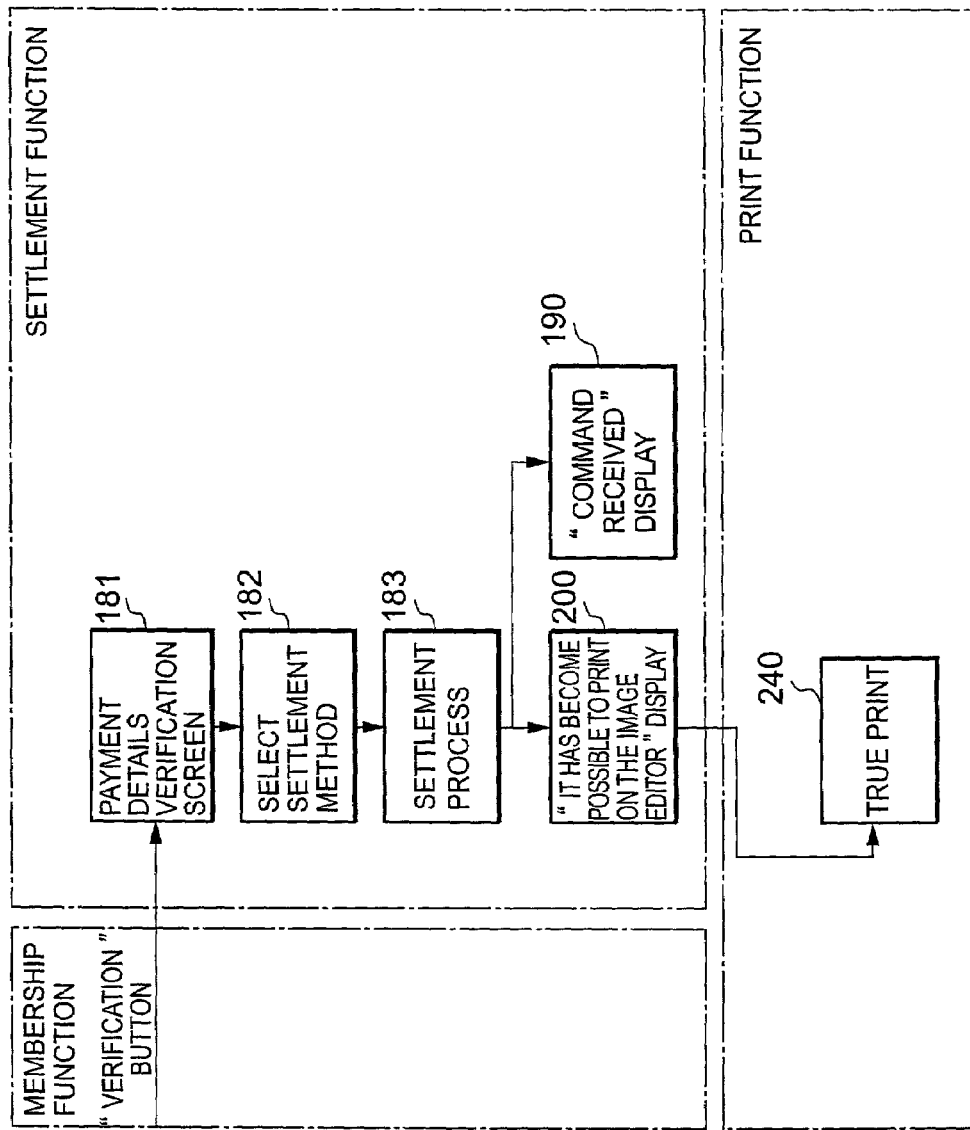
FIG. 16 is a flowchart showing the transitions of the screen in the settlement process when an image is printed by the output center and another image is printed with the user's printer.

The flow of the screen transitions from when the image editor 22 is started until the true print, discussed above, are shown more specifically in FIGS. 12 through 16. Here, FIGS. 12 and 13 show this flow in the case where only images to be printed on the user's printer are entered in the keeping list 140 (in effect, from Step 144 in FIG. 9). FIGS. 14 to 16 show the flow in the case where images to be printed on the user's printer and images to be printed at the output center are mixed together in the keeping list 140 (in effect, from Step 145 in FIG. 9).

In the case where only images to be printed on the user's printer are entered in the keeping list 140 as shown in FIG. 12, the print purpose display screen 211 is shown when the image editor 22 is started (Step 144). There, the user selects the print purpose (for example, printing as is, calendar, postcard, etc.), and next advances to the template display screen 212, where the user selects a template prepared in advance for each purpose (layout sample).

The user next advances to the form setting display screen 213 and selects the print size and form orientation. Next, the user advances to the layout process 211 and downloads the keeping list 140 and layout images and so forth for images registered therein, to the image editor 22 from the web browser 12. The user then selects the images he or she wants to print from the keeping list 140 and edits the layout and design of the print page using the layout image for the selected image. In this layout process 221, the image editor 22 allows the user to make editing operations for the page layout and design within a scope allowed for the selected image according to control data appended to the layout image. When the layout process 221 is finished (Step 222), the user can make the test print 230 and see whether the editing results are good or bad.

Thereafter, the user can advance to the process to make a true print on his or her own printer. Instead of that, however, the user can send the abovementioned editing results (data showing only the formatting such as the positioning of each image and text, and the size and color, on the print page) to the web server 12 and make a print request to the output center 3. In this way, a method, wherein page editing is carried out on the user system and the results are sent to the server 12 and a print request made to the output center 3, is more convenient because of the low load on the server 12 and also for the user who saves on fees for connecting with the server 12, as compared to the method discussed above where editing is carried out on the server 12 and the print request is made to the output center 3. Also, page editing by the image editor 22 on the user system allows the user to add images independently located on the user system, as well as the images provided by the server 12, to the print image. As a result, this is very desirable for the user who makes a print request to the output center 3 and attains beautiful prints in sizes that cannot be realized with the user's printer. In the case of the user adding images independently located on the user system to the print page, and editing and having this printed by the output center 3, the image editor 22 sends the data for the images independently located on the user system to the web server 12 along with the editing results. The web server 12 sends those editing results, the image data for images on the web server 12 placed in the edited print page, and image data received from the user system to the output center 3.

After the abovementioned editing is complete, the control returns to the web browser 21 temporarily in the case where the user makes the true print on his or her own printer, as shown in FIG. 13. The user verifies the image (image after the completion of the layout process) purchased on the product list screen 153 of the web browser 21 and then advances to membership authentication and settlement processing. The procedures for the membership authentication and settlement processing (blocks 161 to 183) are the same as those for when all printing is done at the output center, as already explained with reference to FIGS. 10 and 11. Moreover, the settlement process is not necessary in the case where only free images are used. Once the settlement process 183 is complete, the screen 200 "You can now print with the image editor" is shown. Thereafter, control returns to the image editor 22 and the true print 240 can be made from the image editor 22.

When there is an error in the true print from the image editor 22, the image editor 22 can apply to the web server 12 for a reprint along with the reason for that error. Thereupon, the web server 12 authorizes the image editor 22 to make another true print of the same page and saves a log of that application. Accordingly, even in the unlikely event of a printing error, The user is ensured the acquisition of the correct output without wasting fees paid. The repetition of the true print is authorized up to a prescribed number of times (for example, three times). By saving and analyzing the application log, the web server 12 can detect persons making fraudulent use of this true print do-over function.

In the case where images to be printed on the user's printer and images to be printed at the output center are mixed together in the keeping list 140 as shown in FIG. 14, the image editor is started (Step 145), editing is carried out with the same procedures as explained with reference to FIG. 12 for either images to be printed on the user's printer or images to be printed at the output center, and then the test print can be made. Thereafter, as shown in FIGS. 15 and 16, the user temporarily returns to the web browser 21, selects accessories or a frame for the image to be printed at the output center, and then carries out the membership authentication and settlement processing with the same procedures as already explained. When membership authentication and settlement are finished, the output center is sent a request for images to be printed at the output center, and the "Command received" screen 190 is displayed; and the true print 240 is made using the image editor 22 for images to be printed on the user's printer.

The flow of screen transitions from the image search until printing was shown above. In the flow discussed above, membership authentication was carried out directly before the settlement process. It is not however necessary for this to be the case. In another method, membership authentication may be made before accessing the keeping list 140, for example (in effect, only members have a keeping list 140), in advance of the preview display (in effect, non-members can only search for images), or before making an image search (in effect, non-members cannot substantially use this web server).

FIGS. 17 to 28 more specifically show the screens displayed by the image editor 22.

Figure 17:
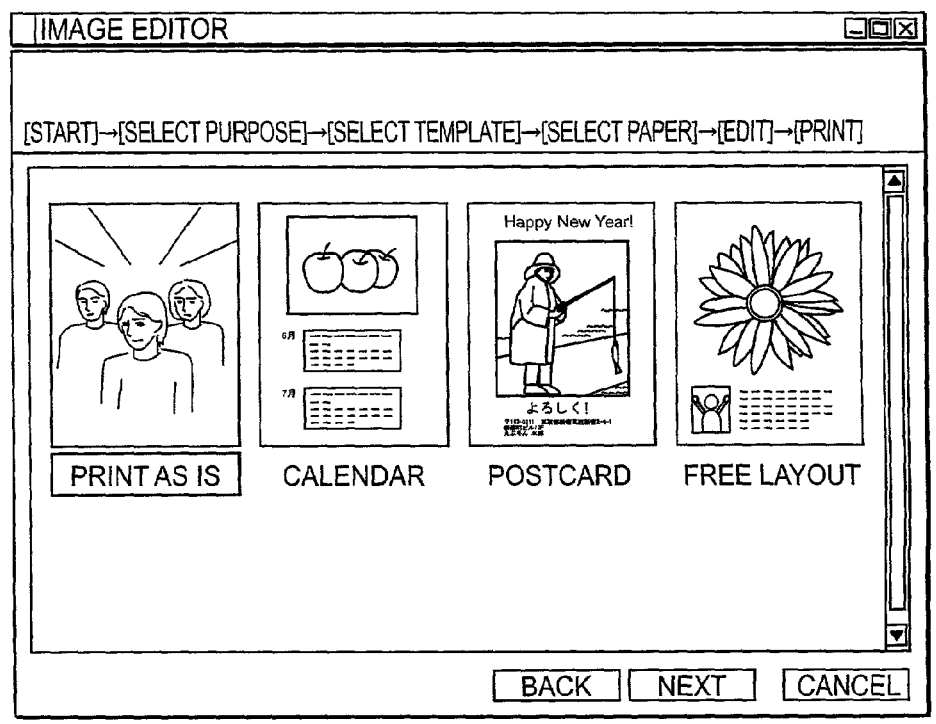
FIG. 17 is a drawing showing an example of the print purpose display screen 211 shown in FIGS. 12 and 14.

FIG. 17 shows an example of the print purpose display screen 211 shown in FIGS. 12 and 14. In this screen, the following types of print purposes are displayed along with image print samples as shown: print as is, calendar, postcard, free layout. The user selects any of the purposes on this screen. The screen shown in FIG. 18 is displayed by the user clicking on the "Next" button.

Figure 18:
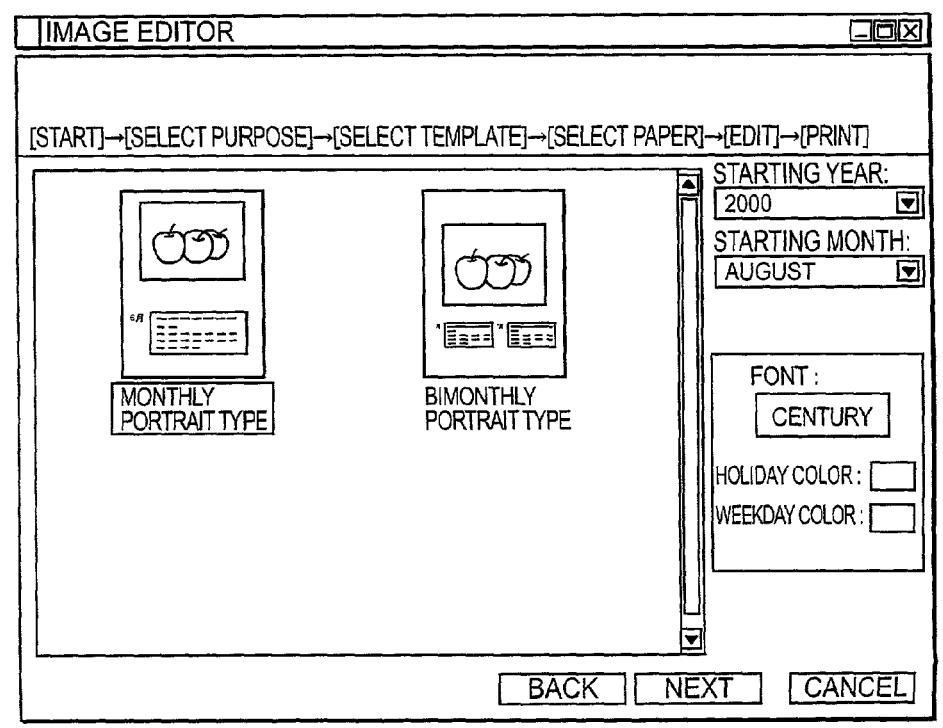
FIG. 18 is a drawing showing an example of the template display screen 212 shown in FIGS. 12 and 14.

FIG. 18 shows an example of a template display screen 212 shown in FIGS. 12 and 14. As shown in this screen, a number of templates prepared in advance for each print purpose (sample page layouts) is displayed (the figure shows an example of a calendar template). The user selects any of the templates on the screen. On the screen, the user can also designate the starting date and print colors for vacation days and weekdays on the calendar, printed sentences and print colors for elements on the postcard, and so forth. The screen shown in FIG. 19 is displayed by the user clicking on the "Next" button.

Figure 19:
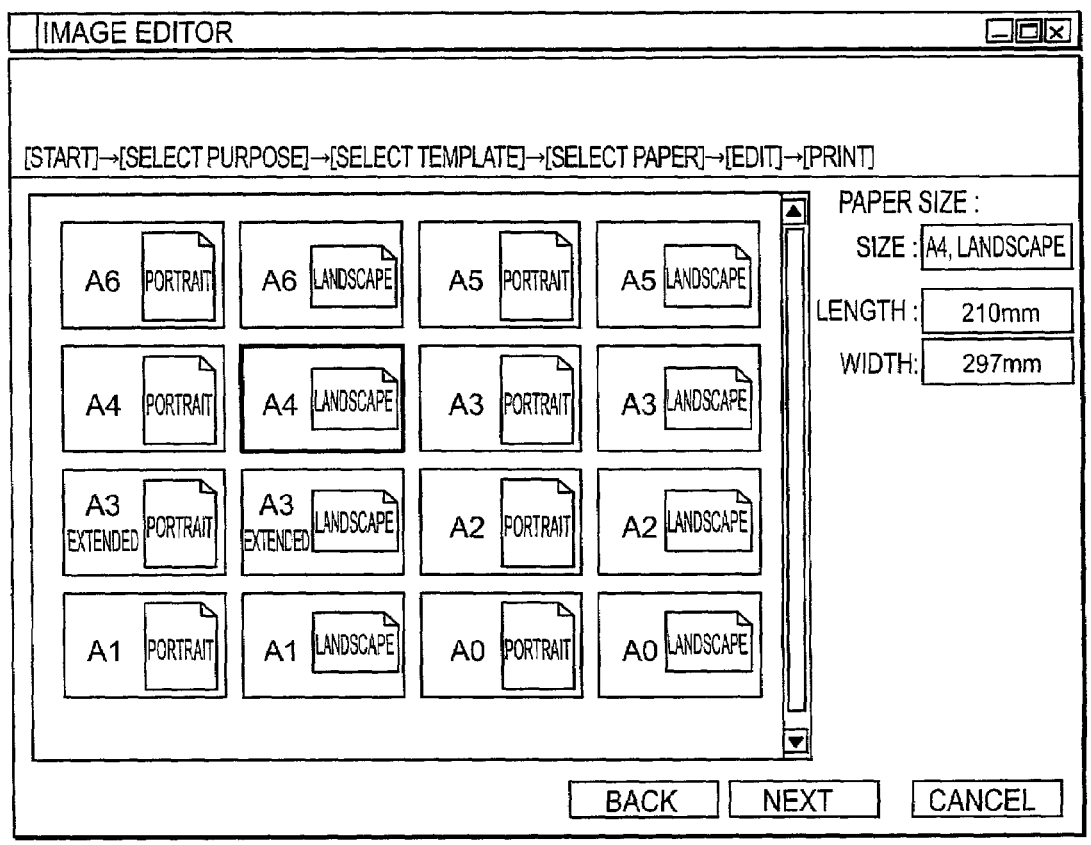
FIG. 19 is a drawing showing an example of the paper setting display screen 213 shown in FIGS. 12 and 14.
Figure 20:
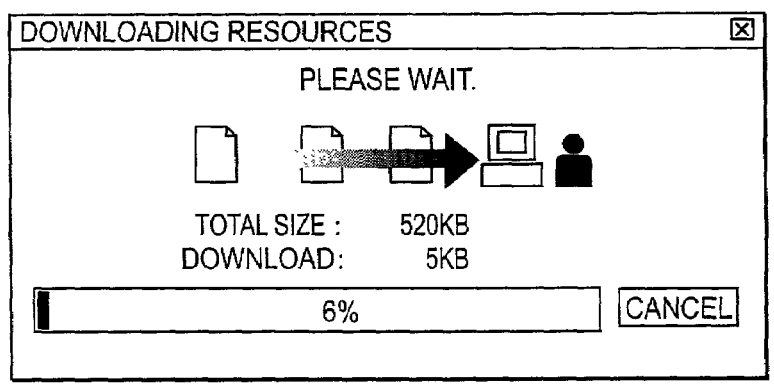
FIG. 20 is a drawing showing an example of the screen showing the progress of the resource download from the web server 12 to the image editor 22.

FIG. 19 shows an example of the paper setting display screen 213 shown in FIGS. 12 and 14. On this screen, the paper size and orientation used in the print can be set. When the user clicks on the "Next" button, the downloading of the keeping list and resources such as layout images for images in the keeping list is started. During the downloading, the screen showed in FIG. 20 is displayed and shows the progress of the downloading.

Figure 21:
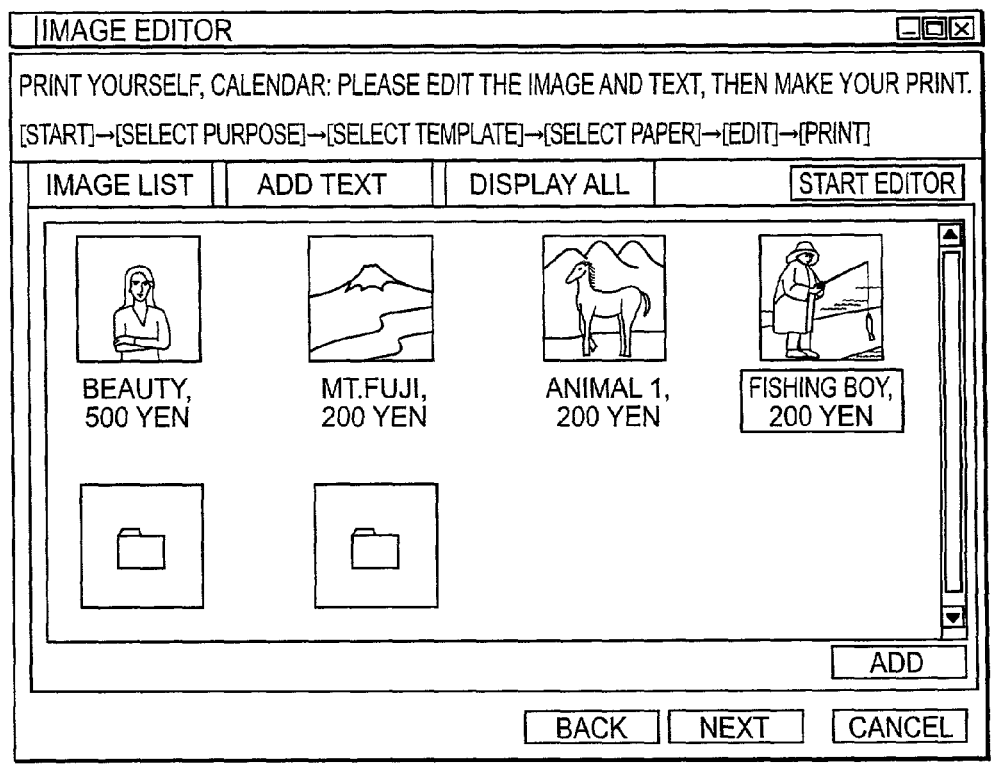
FIG. 21 is a drawing showing in example of an image list window.

When the downloading of resources is ended, as shown in FIG. 21, the keeping list is displayed in the window with the tag "Image list" (below, the keeping list on the image editor 22 is called the image list). Thumbnail images (or palette images which are slightly larger), image titles, prices, and so forth for images to be kept are displayed in this image list.

Figure 22:
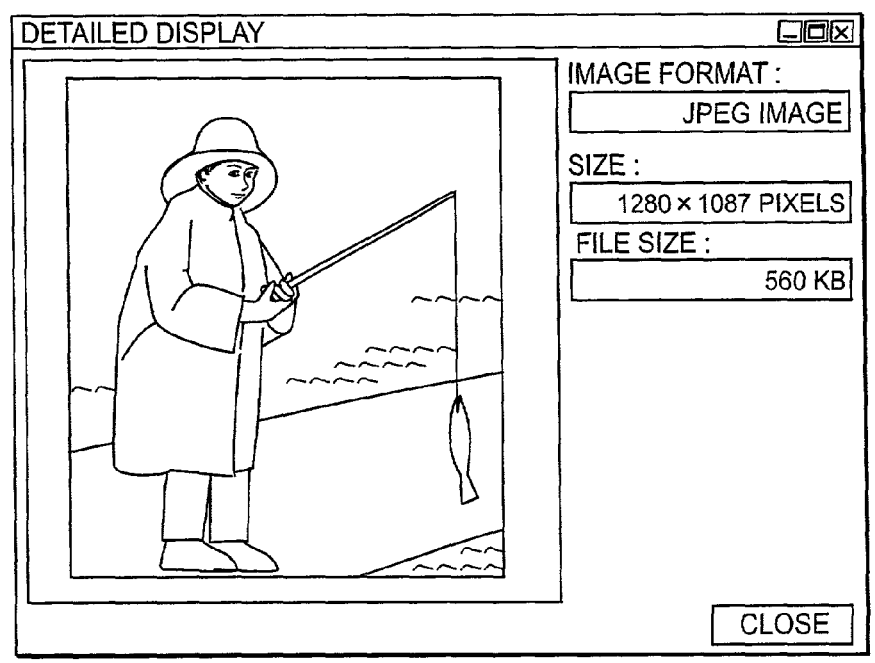
FIG. 22 is a drawing showing example of a window showing details of one image.

When the user double clicks on any image in this image list, the large layout image for that image, along with the file format, pixel size, data size, and so forth for that image can be viewed as shown in FIG. 22.

Figure 23:
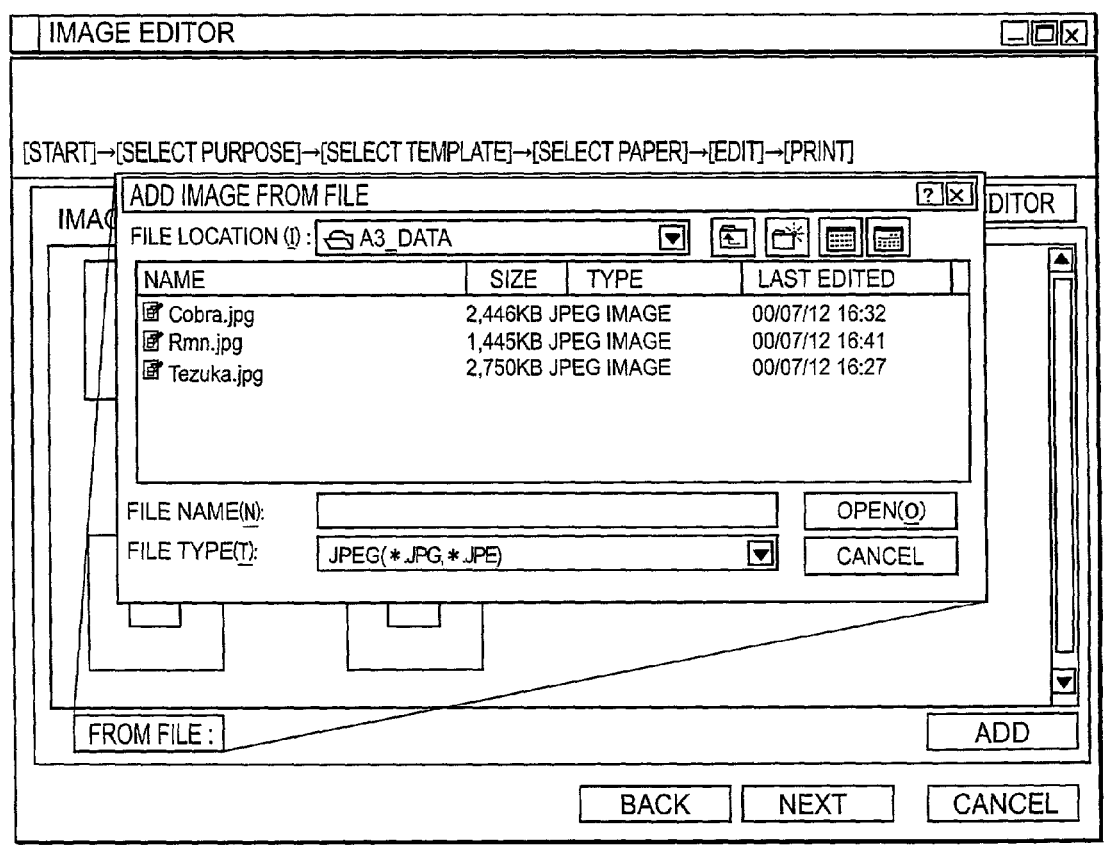
FIG. 23 is a drawing showing an example of window for adding images.

Also, by the user clicking on the "Add" button in FIG. 21, an image file located in any directory on the user PC 6 can be added to the image list as shown in FIG. 23.

Figure 24:
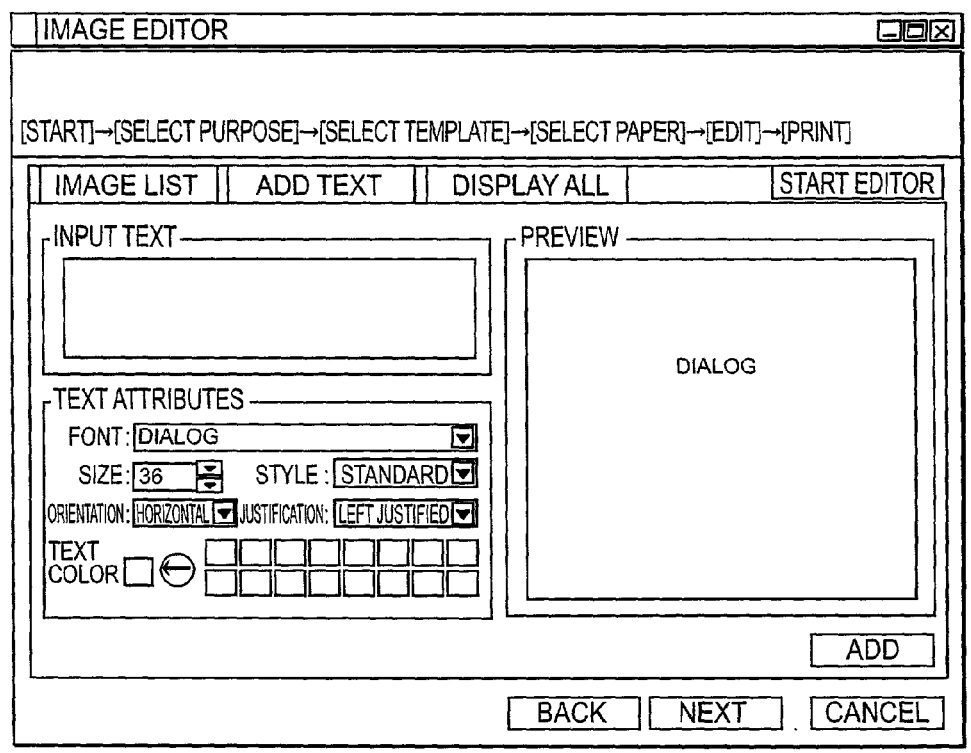
FIG. 24 is a drawing showing an example of a window for adding character strings.

Also, when the user displays the window with the tag "Add text" in FIG. 21 to the forefront, the user can edit character strings inserted in the print page, in the case of a calendar or postcard, as shown in FIG. 24.

Figure 25:
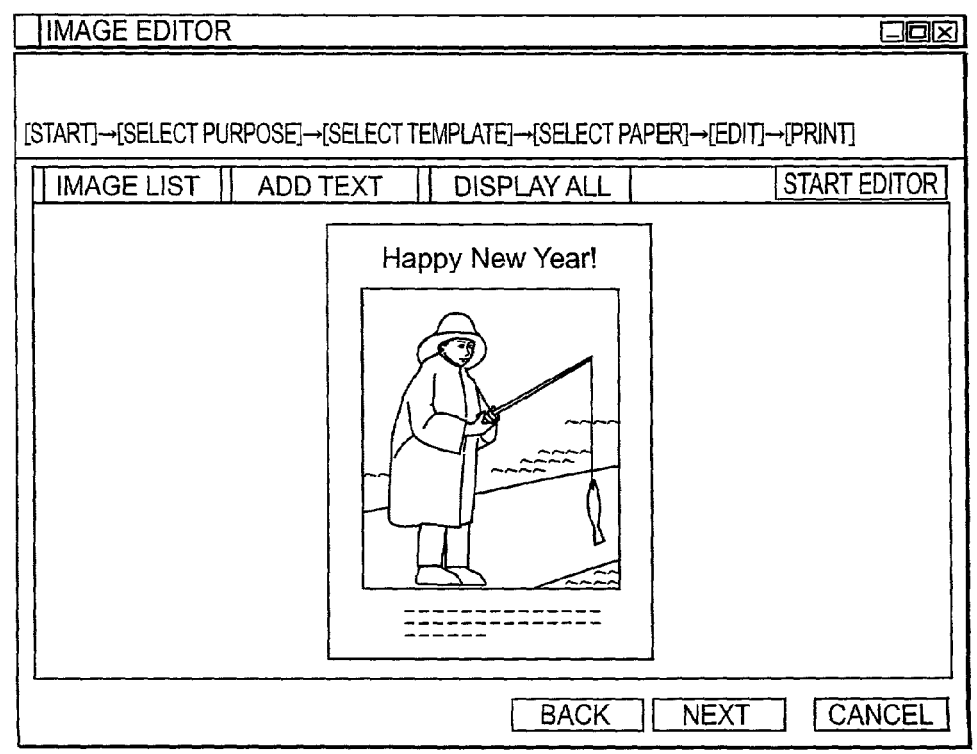
FIG. 25 is a drawing showing an example of a full display window.

Also, when the user displays the window with the tag "Show all" in FIG. 21 to the forefront, an image of the entire print page can be viewed as shown in FIG. 25.

Figure 26:
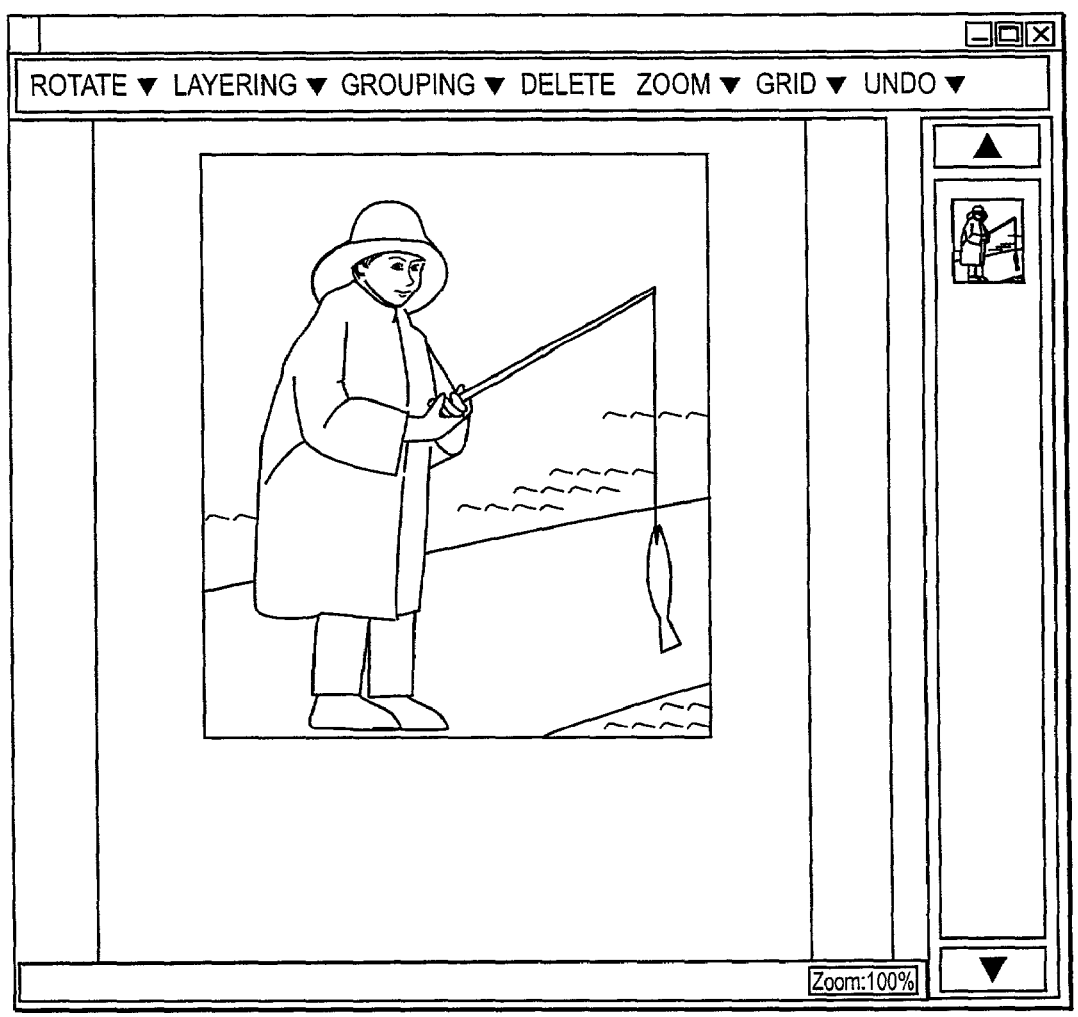
FIG. 26 is a drawing showing an example of an editor window.
Figure 27:
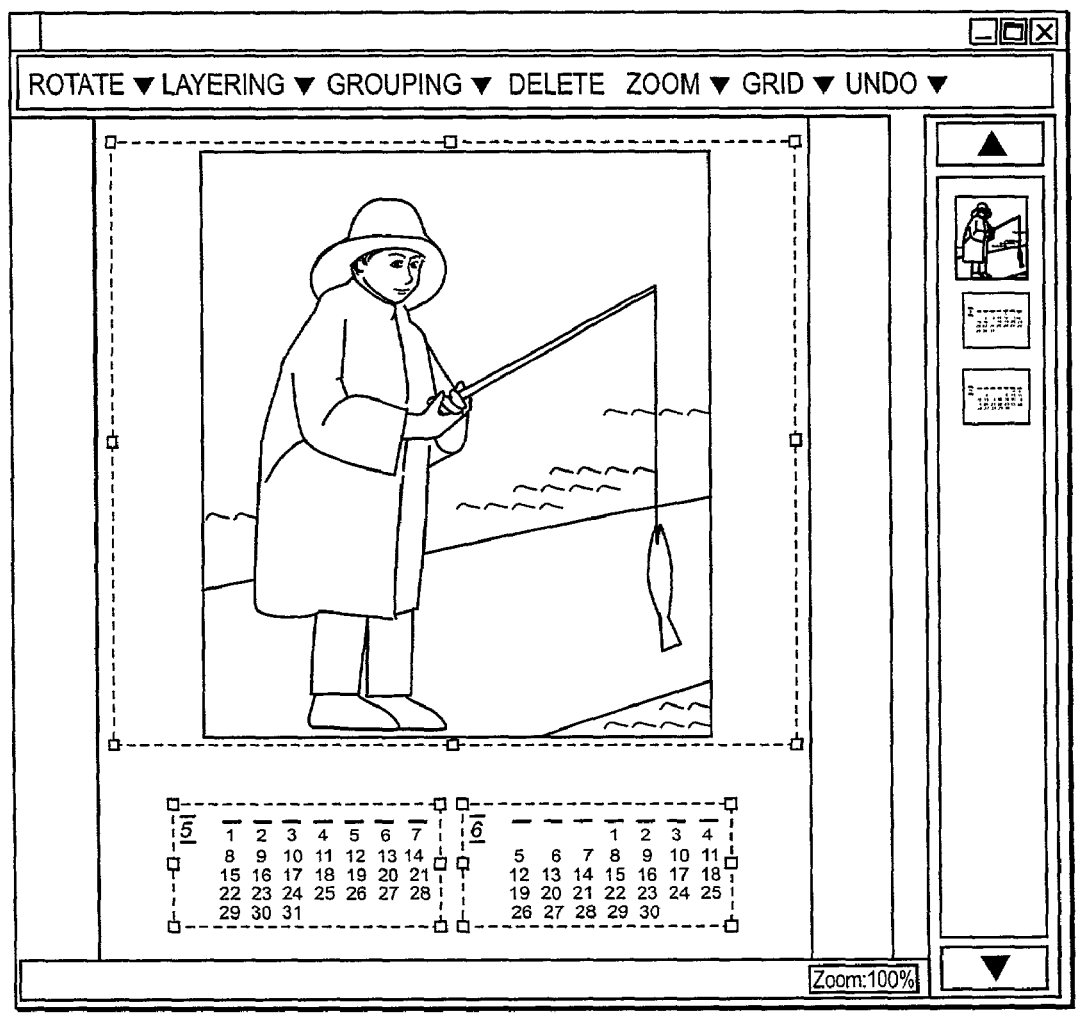
FIG. 27 is a drawing showing in example of editing in the editor window.

By the user clicking on the "Start editor" button in the screens in FIGS. 21 through 25, the editor window showed in FIG. 26 is displayed and the layout and design can be edited with more precision that on the print page. For example, as shown in FIG. 26, the sizes, colors, and arrangement of images disposed in the page, the calendar, and character strings can be edited.

Through the abovementioned editing operation, the image editor 22 controls the editing operations allowed to the user according to the control data appended to the layout image. For example, in the example shown in FIG. 27, changing the size of a image is not possible if enlargement and reduction of the image are prohibited.

Figure 28:
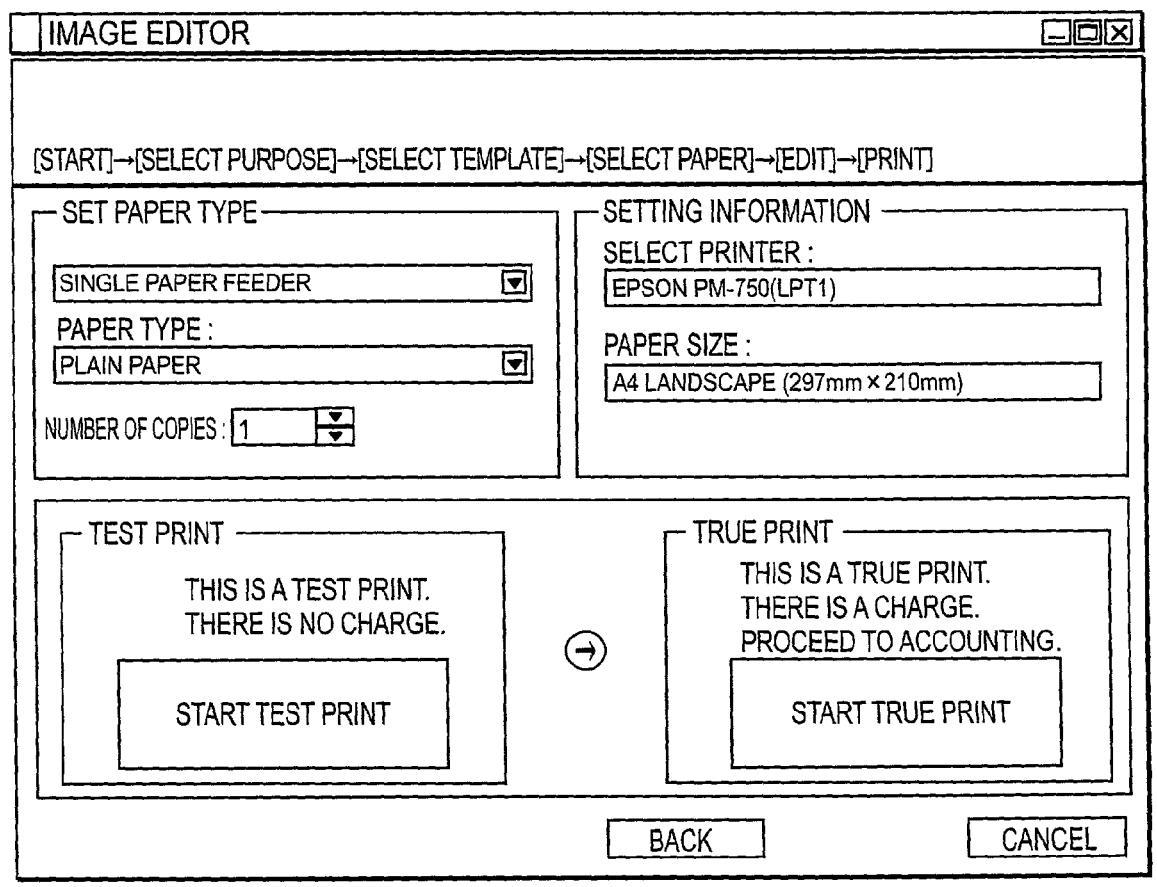
FIG. 28 is a drawing showing the print window.

When editing is finished, the display switches to the print window shown in FIG. 28 and the test print or true print can be made. In the case of making the true print, unlike the case where only free images are used, the display must return to the web browser 22 temporarily as discussed above and membership authentication and settlement completed.

An embodiment of the present invention was explained above, but this embodiment was used as an example for explaining the present invention and the present invention is not limited by this embodiment. Consequently, the present invention can be applied in various forms other than the abovementioned embodiment.

What is claimed is:

1. A system for distributing images through a communications network to a user system on which an image editor is installed, the image editor edits and prints a print page having an image incorporated therein, comprising:

image storing means for storing, with respect to each of a plurality of images that can be distributed, first true image data, encrypted with a prescribed encryption method that can be decrypted only by said image editor within the user system, a second image data having a smaller number of pixels than said true image data, and control data indicating usage restrictions for said each image, where said true image data is printed on a print page having said each image incorporated thereon at said image editor, where the print page at said image editor is edited using said second image data before executing printing of said true image data on said print page and said control data controlling said image editor to restrict editing operations for editing said print page using said second image data that can be carried out at said image editor, wherein said printing of said true image can be carried out only on said print page which has been edited by said editing operations restricted by said control data, in both cases where the printing is carried out by a printer of a user and where the printing is carried out by professional printing service;

second image transmission means for selecting one image from among said plurality of images, and transmitting said second image data and said control data for the selected image to said user system;

downloading means for transmitting said encrypted true image data for said selected image to said user system upon receipt of a request from a user;

usage right determining means for determining whether the user of said user system has a usage right for said true image data; and usage authorizing means for authorizing said image editor on said user system to decrypt said encrypted true image data and output said print page using the decrypted true image data according to said usage right, only when said user is determined by said usage right determining means to have said usage right.

2. The system according to claim 1, wherein said image storing means stores preview image data, as said second image data with respect to said each image, which is used for previewing said each image and designating the use or print size of said each image at said image editor;

said second image transmission means includes preview image transmission means for transmitting said preview image data and said control data for said selected image to said user system; and said control data, transmitted to said user system, controls said image editor to restrict the use or print size that can be designated at said image editor, when said image editor designates the use or print size of said selected image.

3. The system according to claim 1, further comprising means for inserting an electronic watermark in said true image.

4. The system according to claim 1, further comprising means for authorizing said user system to make test output of said true image data in an incomplete output format.

5. The system according to claim 1, further comprising a second output of said true image data, from said image editor, when an error occurs in the first output of said true image data.

6. The system according to claim 1, wherein the usage restrictions for said each image comprises at least two items from a group of rights having: a permission to print the true image data on a printer of the user, a permission to transmit the true image data to a professional printing services and print the transmitted true image data at the professional printing services, a permission to adjust size, layout and design for printing of the true image data, and a permission to edit the true image data by editing corresponding second image data.

7. The system according to claim 1, wherein the second image data has a lower resolution than the true image data, and wherein the user is not charged for the output of the second image data and is charged for the output of the print page having the true image data incorporated therein.

8. The system according to claim 1, wherein:
the usage restrictions for said each image comprises a permission to adjust size, layout and design for printing of the true image data and a permission to edit said each image, and
a resolution level for the output of the print page with true image data incorporated therein is adjusted based on the size selected by the user.

9. The system according to claim 1, wherein the true image data is printed in accordance with the usage restrictions and in an adjusted layout and design.

10. The system according to claim 1, wherein:
said true image data and said second image data stored in said image storing means are encrypted in a form that can only be decrypted by said image editor,
when said image editor has not been installed in said user system, said second image transmission means transmits said image editor to said user system, and thereafter transmits said second image data and said control data to said user system only when accessed by said image editor of said user system, and
said downloading means transmits said true image data to said user system only when accessed by said image editor of said user system.

11. The system according to claim 1, wherein said control data restricts editing operations of said second image data that has been accessed by a user.

12. The system according to claim 1, wherein the control data restricts the editing operations of the second image data without impacting access to and display of the first and second images.

13. The system according to claim 1, wherein the image editor displays the second image data and the second image is edited in the image editor and wherein during the editing, only some of the editing operations are executed and others are restricted by the control data.

14. A method for distributing images through a communications network to a user system on which an image editor is installed, the image editor provides for editing and printing a print page having an image incorporated therein, the method comprising:
storing, with respect to each of a plurality of images that can be distributed, first true image data, encrypted with a prescribed encryption method that can be decrypted only by said image editor within the user system, a second image data having a smaller number of pixels than said true image data, and control data indicating usage restrictions for said each image, where said true image data is printed on a print page having said each image incorporated thereon at said image editor, where the print page at said image editor is edited using said second image data before executing printing of said true image data on said print page and said control data controlling said image editor to restrict editing operations for editing said print page using said second image data that can be carried out at said image editor, wherein said printing of said true image can be carried out only on said print page which has been edited by said editing operations restricted by said control data, in both cases where the printing is carried out by a printer of a user and where the printing is carried out by professional printing service;
selecting one image from said plurality of images;
transmitting said second image data and said control data for the selected image to said user system; and
downloading said encrypted true image data for said selected image to said user system upon receipt of a request from a user;
determining whether the user of said user system has a usage right for said true image data; and
authorizing said image editor on said user system to decrypt said encrypted true image data and output said print page using the decrypted true image data according to said usage right, only when said user is determined to have said usage right.

15. The method according to claim 14, further comprising:
carrying out processing relating to fees charged to said user with respect to chargeable image data; and
authorizing said image editor to output said true image data for said chargeable image data only when said processing relating to fees is completed.

16. The method according to claim 14, further comprising:
giving a preview of said true image data for said selected image by displaying the second image data on said user system; and
causing display of explanatory text of the usage restrictions according to copyright for said selected image on said user system.

17. The method according to claim 14, further comprising:
preparing said image editor; and
distributing said image editor to said user system.

18. The method according to claim 14, further comprising inserting an electronic watermark in said second data.

19. The method according to claim 14, further comprising inserting an electronic watermark in the true image data for said selected image when said editor outputs said true image data.

20. The method according to claim 14, further comprising authorizing said image editor within said user system to make test output of said print page with the true image data in an incomplete output format.

21. The method according to claim 14, further comprising enabling a second output of said print page with the true image data from said image editor when an error occurs in the first output of said print page.

22. The method according to claim 14, wherein the control data restricts the editing operations of the second image data that has been accessed by a user.

23. The method according to claim 14, wherein the control data restricts editing operations of the second image data without impacting access to and display of the first and second images.

24. The system according to claim 14, wherein the image editor displays the second image data and the second image is edited in the image editor and wherein during the editing, only some of the editing operations are executed and others are restricted by the control data.

* * * * *